(12) United States Patent
Sharifi et al.

(10) Patent No.: US 9,208,225 B1
(45) Date of Patent: Dec. 8, 2015

(54) INCENTIVE-BASED CHECK-IN

(71) Applicant: Google Inc., Mountain View, CA (US)

(72) Inventors: Matthew Sharifi, Zurich (CH); Yaniv Bernstein, Parkville (AU); Dominik Roblek, Mountain View, CA (US); Annie Chen, Thalwil (CH); Matthew Wiseman, San Francisco, CA (US)

(73) Assignee: Google Inc., Mountain View, CA (US)

( * ) Notice: Subject to any disclaimer, the term of this patent is extended or adjusted under 35 U.S.C. 154(b) by 215 days.

(21) Appl. No.: 13/732,030

(22) Filed: Dec. 31, 2012

Related U.S. Application Data

(60) Provisional application No. 61/603,081, filed on Feb. 24, 2012.

(51) Int. Cl.
G06F 17/30 (2006.01)

(52) U.S. Cl.
CPC .... *G06F 17/30743* (2013.01); *G06F 17/30017* (2013.01)

(58) Field of Classification Search
CPC .............. G06F 17/30026; G06F 17/30743; G06F 17/30864; G06F 21/10; G06F 21/31; G06F 21/33; G06F 2221/0737; G06F 2221/2115; G06F 2221/2135; G06Q 20/12; G06Q 20/1235; G10L 19/018; G10L 25/54; G11B 20/00884; G11B 20/00891; H04N 21/235; H04N 21/25875; H04N 21/435; H04N 21/4753; H04N 21/6581; H04N 21/8358
USPC ............ 700/94; 704/231; 705/26.1, 51; 707/769, 999.003, E17.009, E17.014, 707/E17.108; 715/201, 205; 725/133, 18, 725/19; 726/27, 28
See application file for complete search history.

(56) References Cited

U.S. PATENT DOCUMENTS

| 7,043,473 | B1 | 5/2006 | Rassool et al. |
|---|---|---|---|
| 7,489,767 | B2 | 2/2009 | Hikishima |
| 7,518,052 | B2 | 4/2009 | Kourbatov |
| 7,796,635 | B2 | 9/2010 | Nakata |
| 8,115,089 | B2 | 2/2012 | Saino et al. |
| 8,116,746 | B2 | 2/2012 | Lu et al. |
| 2002/0069073 | A1 | 6/2002 | Fasciano |
| 2002/0072982 | A1* | 6/2002 | Barton et al. ............ 705/26 |
| 2002/0086269 | A1 | 7/2002 | Shpiro |
| 2002/0198789 | A1 | 12/2002 | Waldman |
| 2003/0037010 | A1 | 2/2003 | Schmelzer |
| 2003/0233930 | A1 | 12/2003 | Ozick |

(Continued)

OTHER PUBLICATIONS

"BMAT—Barcelona Music & Audio Technologies," Website for BMAT, 2005-2011, 1 page, [online] [retrieved on May 31, 2011] retrieved from the internet <URL:http.bmat.com/>.

(Continued)

*Primary Examiner* — Alexander Eljaiek
(74) *Attorney, Agent, or Firm* — Fenwick & West LLP

(57) ABSTRACT

Apparatus, systems and methods provide incentive-based usage of an audio recognition system. In an aspect, a system is provided that includes a query component configured to receive an audio sample from a device and a recognition component configured to determine an identification of the audio sample. The system further includes a reward component configured to identify a reward associated with the identification of the audio sample, wherein the query component is further configured to provide a query result to the device, the query result comprising the identification of the audio sample and the reward associated therewith.

14 Claims, 20 Drawing Sheets

(56) References Cited

U.S. PATENT DOCUMENTS

| | | |
|---|---|---|
| 2004/0190687 A1 | 9/2004 | Baker |
| 2005/0010407 A1 | 1/2005 | Jaroker |
| 2005/0281410 A1 | 12/2005 | Grosvenor |
| 2006/0235864 A1 | 10/2006 | Hotelling et al. |
| 2007/0038446 A1 | 2/2007 | Shen et al. |
| 2007/0083537 A1 | 4/2007 | Martinez |
| 2007/0131094 A1 | 6/2007 | Kemp |
| 2007/0280225 A1 | 12/2007 | Forbes et al. |
| 2008/0221881 A1 | 9/2008 | Carraux et al. |
| 2008/0223200 A1 | 9/2008 | Kwak |
| 2009/0025540 A1 | 1/2009 | Hillborg |
| 2010/0042647 A1 | 2/2010 | Schultz et al. |
| 2010/0228546 A1 | 9/2010 | Dingler et al. |
| 2012/0139951 A1 | 6/2012 | Hwang et al. |

OTHER PUBLICATIONS

"BMAT music innovation," Barcelona Music & Audio Technologies, 2005-2011, 2 pages, [online] [retrieved on Apr. 25, 2011] Retrieved from the internet <URL:http://www.bmat.com/company>.

"CBMS Networks, Inc.—Advanced DSP for Media Analysis, Indexing, and Search," Website for CBMS Networks, Inc., 2010, 1 page, [online] [retrieved on May 31, 2011] retrieved from the internet<URL:http://cbmsnetworks.com/>.

"Pitch detection algorithm," Wikipedia, last modified on Aug. 3, 2010, 3 pages, [online][retrieved on Dec. 15, 2010] Retrieved from the internet <URL:http://en.wikipedia.org/wiki/Pitch detection algorithm>.

"Sound Hound Instant Music Search and Discovery," Sound Hound Inc., 2011, 1 page, [online] [retrieved on Apr. 25, 2011] Retrieved from the internet <URL:http://www.soundhound.com/>.

Baluja, et al., "Content Fingerprinting Using Wavelets," 3rd European Conference on Visual Media Production, 2006, 10 pages.

Baluja, S., et al., "Waveprint: Efficient wavelet-based audio fingerprinting," Pattern recognition, 2008, pp. 3467-3480, vol. 41, No. 11.

Bertin-Mahieux, T., et al., "Large-scale cover song recognition using hashed chroma landmarks," In Proceedings of the International Symposium on Music Information Retrieval (ISMIR), Oct. 16-19, 2011, 4 pages.

Cano, P., et al., "A Review of Algorithms for Audio Fingerprinting," IEEE Workshop on Multimedia Signal Processing, Dec. 9-11, 2002, 5 pages.

Casey, M., et al., "Analysis of minimum distances in high-dimensional musical spaces," IEEE Transactions on Audio, Speech, and Language Processing, Jul. 2008, pp. 1015-1028, vol. 16, No. 5.

Dehak, N., et al., "Front-End Factor Analysis for Speaker Verification," IEEE Transactions on Audio, Speech and Language Processing, May 2011, 11 pages, vol. 19, No. 4.

Egorov, A., et al., "Cover Song Identification with 1f-F0 Pitch Class Profiles," MIREX extended abstract, Sep. 2008, 4 pages.

Ellis, D., et al., "The 2007 Labrosa Cover Song Detection System," Music Information Retrieval Evaluation eXchange (MIREX), Australian Computer Society, 2007, 4 Pages.

Haitsma, J., et al., "A Highly Robust Audio Fingerprinting System," 2002, 9 pages.

Ives, D., et al., "Pitch strength decreases as f0 and harmonic resolution increase in complex tones composed exclusively of high harmonics," The Journal of the Acoustical Society of America, May 2008, pp. 2670-2679, vol. 123, No. 5.

Jensen, J., et al., "A Tempo-Insensitive Distance Measure for Cover Song Identification Based on Chroma Features," Proc. IEEE Int. Conf. Acoust., Speech, Signal Processing, 2008, pp. 2209-2212.

Katsiamis, A.G., et. al., "Practical Gammatone-Like Filters for Auditory Processing," EURASIP Journal on Audio, Speech, and Music Processing, v. 2007, Article ID 63685, 15 pages.

Lu, J., "Video Fingerprinting and Applications: a review," Media Forensics & Security Conference, 2009, 31 pages, San Jose, CA.

Lu, J., "Video fingerprinting for copy identification: from research to industry applications," Proceedings of SPIE—Media Forensics and Security XI, Jan. 2009, 16 pages, vol. 7254.

Lyon, et al., "Sound Retrieval and Ranking Using Sparse Auditory Representations," Neural Computation, Sep. 2010, 31 pages, vol. 22, No. 9.

Lyon, R., "A Computational Model of Filtering, Detection, and Compression in the Cochlea", Proceedings IEEE International Conference on Acoustics, Speech, and Signal Processing, Paris, May 1982, pp. 1282-1285.

Marolt, M., "A mid-level representation for melody-based retrieval in audio collections," IEEE Transactions on Multimedia, Dec. 2008, pp. 1617-1625, vol. 10, No. 8.

Media Hedge, "Digital Fingerprinting," White Paper, Civolution and Gracenote, 2010, 12 pages.

Milano, Dominic, "Content Control: Digital Watermarking and Fingerprinting," White Paper, Rhozet, a business unit of Harmonic Inc., Last accessed Jul. 31, 2012, 11 pages.

Mohri, M., et al., "Speech Recognition with Weighted Finite-State Transducers," Springer Handbook on Speech Processing and Speech Communication, 2008, 31 pages.

Notice of Allowance for U.S. Appl. No. 12/826,623, dated Dec. 29, 2011, 28 pages.

Notice of Allowance for U.S. Appl. No. 13/404,978, dated Apr. 3, 2014, 20 pages.

Notice of Allowance for U.S. Appl. No. 13/416,096, dated Apr. 16, 2013, 19 pages.

Notice of Allowance for U.S. Appl. No. 13/615,061, dated Feb. 19, 2013, 19 pages.

Office Action for U.S. Appl. No. 13/416,096, Oct. 4, 2012, 20 Pages.

Office Action for U.S. Appl. No. 13/615,061, Dec. 14, 2012, 17 Pages.

Office Action for U.S. Appl. No. 13/405,023, dated Jan. 16, 2015, 43 pages.

Office Action for U.S. Appl. No. 14/325,002, dated Nov. 21, 2014, 21 pages.

Patterson, R., "Auditory Images: How Complex Sounds are Represented in the Auditory System," Acoustical Science and Technology, Jpn, 2000, pp. 183-190,(E) 21, 4.

PCT International Search Report and Written Opinion, PCT/US2011/041681, Feb. 9, 2012, 6 pages.

Ravuri, S., et al., "Cover song detection: from high scores to general classification," IEEE International Conference on Acoustics Speech and Signal Processing (ICASSP), 2010, pp. 65-68.

Serra, J., Identification of versions of the same musical composition by processing audio descriptions. PhD thesis, Universitat Pompeu Fabra, 2011, 185 pages.

Serra, J., et al., "A Cover Song Identification System Based on Sequences of Tonal Descriptors," MIREX extended abstract, Austrian Computer Society, 2007, 2 pages.

Serra, J., et al., "Audio Cover Song Identification and Similarity: Background, Approaches, Evaluation, and Beyond," Advances in Music Information Retrieval, SCI 274, 2010, pp. 307-332.

Serra, J., et al., "Chroma Binary Similarity and Local Alignment Applied to Cover Song Identification," IEEE Transaction on Audio, Speech, and Language Processing, Aug. 2008, pp. 1138-1151, vol. 16, Issue 6.

Tsai, W., et al., "Using the similarity of main melodies to identify cover versions of popular songs for music document retrieval," Journal of Information Science and Engineering, 2008, pp. 1669-1687, vol. 24.

Wang, A., "An industrial strength audio search algorithm," In International Conference on Music Information Retrieval (ISMIR), Oct. 26-30, 2003, pp. 7-13, vol. 2.

Weintraub, M., "The GRASP Sound Separation System", Proceedings IEEE International Conference on Acoustics, Speech, and Signal Processing, San Diego, Mar. 1984, pp. 18A.6.1-18A.6.4.

Yang, C., Music database retrieval based on spectral similarity. In Proceedings of the International Symposium on Music Information Retrieval (ISMIR), 2001, 2 pages.

Notice of Allowance for U.S. Appl. No. 14/325,002, dated Apr. 13, 2015, 22 pages.

Office Action for U.S. Appl. No. 13/405,023, dated Jun. 5, 2015, 39 pages.

* cited by examiner

INCENTIVE-BASED CHECK-IN

PRIORITY CLAIM

This application claims priority to U.S. Provisional Patent Application Ser. No. 61/603,803 filed on Feb. 24, 2012, entitled "INCENTIVE BASED CHECK-IN." The entirety of the aforementioned application is incorporated by reference herein.

CROSS REFERENCES TO RELATED APPLICATIONS

This application incorporates by reference in its entirety, U.S. patent application Ser. No. 12/826,623, which was filed on Jun. 29, 2010.

TECHNICAL FIELD

The present disclosure generally relates to audio recognition, and specifically to providing incentive-based usage of an audio recognition system.

BACKGROUND

In current audio recognition systems, audio samples are typically recorded live from an environment, and processed in order to extract useful information. For example, a fifteen second audio sample from a song can be captured using a microphone. The sample can subsequently be processed such that the song's title, artist, and album can be identified.

Current audio recognition systems are unable to perform recognitions for more than a single domain or content type. Illustratively, many audio recognition systems are only able to recognize that a captured audio sample is from a song. These same systems cannot, for instance, recognize that an audio sample is from a television show episode, is a sample of a speech, or is an environmental recording (e.g., bird song). As a result, users often switch between different systems in order to properly identify audio samples. Furthermore, current audio recognition systems provide results only after an audio sample has been completely captured. These systems are unable to provide results while an audio sample is still being recorded. As such, users frequently wait relatively lengthy periods before receiving results.

SUMMARY

The following presents a simplified summary of the disclosure in order to provide a basic understanding of some aspects of the disclosure. This summary is not an extensive overview of the disclosure. It is intended to neither identify key or critical elements of the disclosure nor delineate any scope particular embodiments of the disclosure, or any scope of the claims. Its sole purpose is to present some concepts of the disclosure in a simplified form as a prelude to the more detailed description that is presented later.

In accordance with one or more embodiments and corresponding disclosure, various non-limiting aspects are described in connection with providing incentive-based usage of an audio recognition system and reporting of audio events.

In an embodiment, a system is provided that includes a query component configured to receive an audio sample from a device and a recognition component configured to determine an identification of the audio sample. The system further includes a reward component configured to identify a reward associated with the identification of the audio sample, wherein the query component is further configured to provide a query result to the device, the query result comprising the identification of the audio sample and the reward associated therewith. In an aspect, the system further includes a check-in component configured to receive a check-in selection for an item representative of the identification of the audio sample, the check-in selection indicating a user elected desire to associate with the item.

With respect to another embodiment, a method is provided that includes receiving an audio sample from a device and determining an identification of the audio sample. The method further includes identifying a reward associated with the identification of the audio sample, generating a query result based on the audio sample, the query result comprising the identification of the audio sample and the reward associated therewith, and providing the query result to the device.

In yet another embodiment, a system is disclosed having an audio sampling component configured to capture an audio sample and a search component configured to transmit the audio sample to an audio recognition service for identification thereof and receive, from the audio recognition service, a query result based on the audio sample. The system further includes an interface component configured to present the query result to a user, the query result comprising an item identified as the audio sample, a reward associated with the item, and a prompt to check-in for the item, wherein a check-in for the item represents a desire to associate with the item. In an aspect, the system includes a response component configured to receive a selection from a user to check-in for the item, send the check-in selection to the audio recognition service, and receive the reward in response to the check-in selection.

The features and advantages described in this summary and the following detailed description are not all inclusive. Many additional features and advantages will be apparent to one of ordinary skill in the art in view of the drawings, specification and claims hereof.

DETAILED DESCRIPTION

Figure 1:
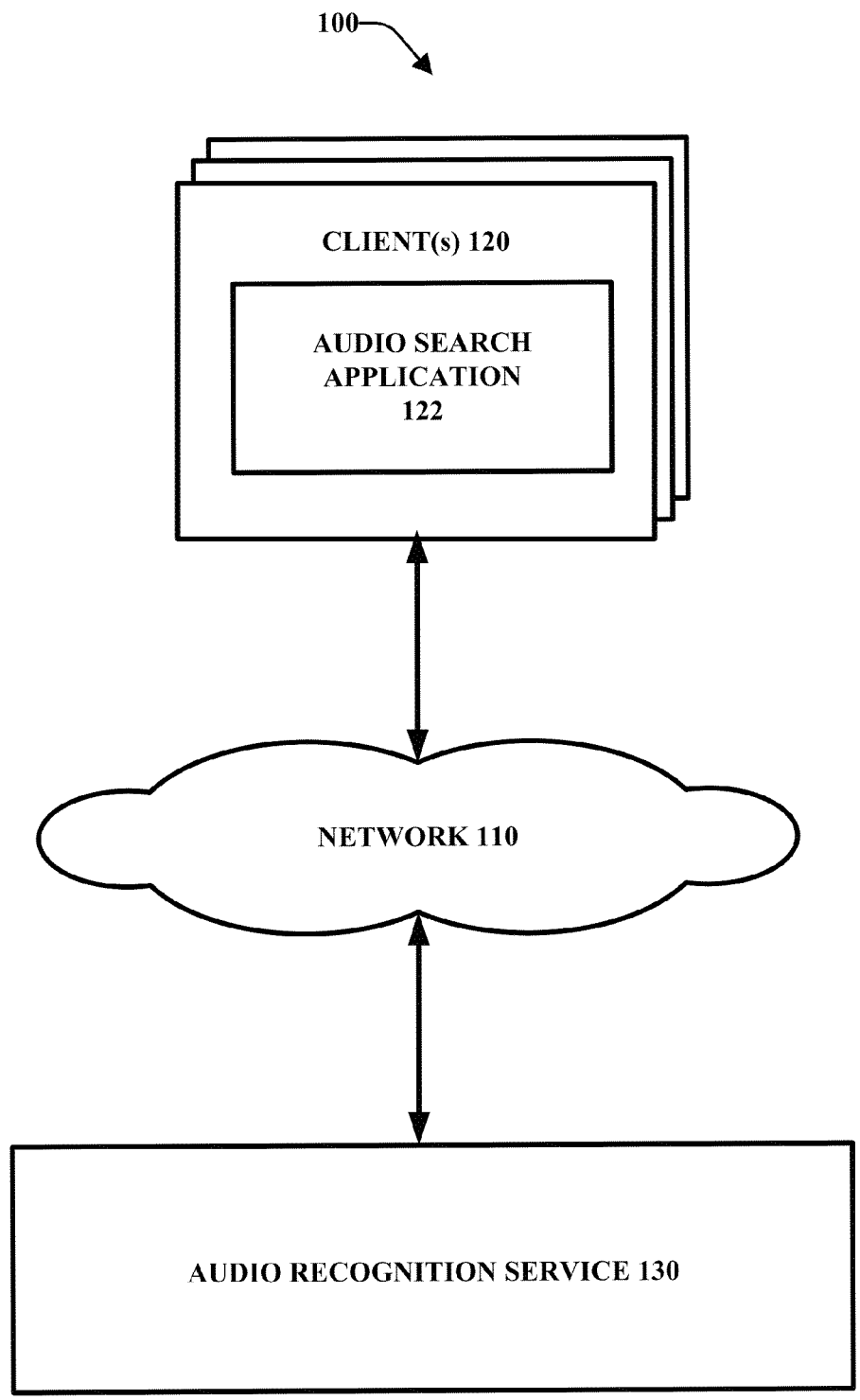
FIG. 1 is a block diagram of an example audio recognition system in accordance with aspects described herein.

The innovation is now described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and components are shown in block diagram form in order to facilitate describing the innovation.

In various aspects, the disclosed subject matter provides a system for identifying an audio sample in real-time or substantially real-time and providing information associated with the identified audio sample, such as a reward or coupon, to a user in exchange for an elected association with the identified audio sample. For example, an audio recognition service can employ multiple audio recognizers to identify an audio sample received from a client device. As used herein the term "audio recognizer" refers to an audio recognition tool configured to recognize an audio sample associated with a single domain type (e.g. music, melody, speech, environmental noise, and etc.). By employing multiple recognizer's, the disclosed systems are capable of identifying various types of audio samples in real-time from various sound domains, including but not limited to, music samples, television samples, spoken word samples, background noise samples, and etc. Further, by using one or more audio recognizers, the audio recognition system can identify a user's current media interaction and/or context using the recognized audio sample. For example, the audio recognition application can identify that a user is watching episode E12 (where E12 is a variable) of television show entitled "ABC," or that a user is listening to a live speech by the President of the United States.

In some aspects, in response to identification of an audio sample by the audio recognition application, the user is provided with information related to the recognized audio sample. This information can include incentives or rewards related to the audio sample that can be provided to the user in response to an elected association with the audio sample. For example, in response to identification that a user is watching E12 of show "ABC," the user can receive a prompt to elect to "check-in" for the episode. By electing to "check-in," the user verifies that he or she in fact is watching or did watch the episode. As used herein, the term "check-in" or "checking-in" refers to an action indicating a user's interaction or interest in an item, person, or event associated with or identified as an audio sample.

In an aspect, a user can be incentivized to "check-in" to an item, person, or event associated with an audio sample through the offering a reward. For example, a reward can include, a special offer, a discount, a promotional package, a virtual badge, a virtual symbol, an achievement level, and/or the like. A reward can be earned after a user checks-in to a set of eligible content items. For example, by checking-in to five episodes of the same television series, a user can receive a special discount on the purchase of a recorded collection for the television series. The same user can also be awarded a virtual badge that can be published to his or her social network user profile. By providing incentives associated with recognized audio samples, the disclosed audio recognition systems can increase its overall usage by users.

Referring now to the drawings, FIG. 1 illustrates an exemplary incentive-based audio recognition system 100 in accordance with aspects described herein. Aspects of systems, apparatuses or processes explained in this disclosure can constitute machine-executable component embodied within machine(s), e.g., embodied in one or more computer readable mediums (or media) associated with one or more machines. Such components, when executed by the one or more machines, e.g., computer(s), computing device(s), virtual machine(s), etc. can cause the machine(s) to perform the operations described.

As shown in FIG. 1, system 100 includes an audio recognition service 130 that communicates with one or more clients 120 over a network 110. Client 120 is configured to generate an audio sample using audio search application 122. In particular, client 120 can include hardware and associated software for recording audio samples from a physical environment. For example, a client 120 can include a microphone, an analog to digital converter (ADC), and an audio codec (e.g., AAC, HE-AAC, MP3, FLAG, ALAC, Vorbis, WMA, and/or the like). Client can further employ audio search application 122 to transmit, via network 110, an audio sample to audio recognition service 130 for processing thereof. For example, audio search application 122 can send a search request for identification of an audio sample to audio recognition service 130.

Audio recognition service 130 is configured to receive an audio sample from a client 120, process the audio sample, and perform an audio recognition query against the audio sample. The query can identify the audio sample and generate information associated with the audio sample. The audio recognition service 130 can further send query results back to client 120. In one aspect, the audio recognition service 130 is configured to identify results across multiple content types (e.g., music types, television program types, etc). For example, the audio recognition service 130 can be configured to identify whether an audio sample is from a song, a television show episode, and/or a famous speech. Identified results can include any useful information regarding an audio sample. In aspect, a query against an audio sample can identify one or more identification classifications of the audio sample. In another aspect, a query can further generate information associated with an identified audio sample, including a reward associated with an identified audio sample. For example, the reward can include a badge or coupon to be earned in response to user elected association with the identified audio sample (e.g. a check-in based on the audio sample).

Search results generated by audio recognitions service 130 can be provided to client 120 via audio search application 122. Audio search application can include an interface tool that allows a user to scroll through search results, view search results, and interact with search results. In an aspect, a received search query can include various identifications of an audio sample as well as options for checking-in for the audio sample and rewards associated therewith. A user can select an identified audio sample and further elect to associate with the audio sample or check-in as a function of the identified audio sample. For example, via audio search application 122, a client 120 can receive a prompt to select a query result and perform an action associated with the identified query result. These actions can include checking-in, sharing the audio sample, or posting information associated with the audio sample to social network.

Audio recognition service 130 can further facilitate carrying out of user initiated actions in response to an identified audio sample. In particular, audio recognition service 130 can receive commands from a client 120 indicating a desired action for an identified audio sample. For example, a user may select to check-in to an identified audio sample in order to receive a reward associated therewith. Audio search application 122 can submit the selection to audio recognition service 130. In response to the received selection, audio recognition service 130 can cause a user to be checked-in, record the checking-in event, and/or issue a reward based on the checking-in event.

A client 120 can include any suitable computing device, such as a mobile phone, a tablet device, a personal computer, a laptop computer, a personal digital assistant, a television, a set top box, a video game console, and/or the like. A client 120 includes a least hardware and associated software for recording audio samples from a physical environment. For example, a client 120 can include a microphone, an analog to digital converter (ADC), and an audio codec (e.g., AAC, HE-AAC, MP3, FLAG, ALAC, Vorbis, WMA, and/or the like). While one clients 120 is shown in FIG. 1, it should be appreciated that such depiction is merely for exemplary purposes. In practice, there can be any suitable number N (where N is a variable) of clients 120 that can communicate and interact with the audio recognition service 130 over network 110.

Audio recognition service 130 can include one or more server programs executing on one or more server-class computers. Each service-class computer comprises a CPU, memory, network interface, peripheral interfaces, and other well known components. The computers themselves run a suitable operating system such as LINUX, UNIX, Microsoft Windows, or Mac OSX, have generally high performance CPUs, 2 GB or more of memory, and 1 TB or more of disk storage. Of course, other types of computers can be used, and it is expected that as more powerful computers are developed in the future, they can be configured in accordance with the teachings here. The functionality implemented by any of the elements can be provided from computer program products (e.g., as computer executable instructions) that are stored in tangible, non-transitory computer-readable storage mediums (e.g., RAM, hard disk, or optical/magnetic media).

Network 110 typically includes the Internet or a mobile network (e.g., a 3G network), but can be any network, including but not limited to any combination of a LAN, a MAN, a WAN, a mobile network, a wired or wireless network, a private network, or a virtual private network.

In an aspect, the audio recognition service 130 is configured to identify and return results for an audio sample prior to receiving the entirety of the audio sample from a client 120. For example, a client 120 can be configured to capture an audio sample fifteen seconds in length. While capturing the audio sample, the client provides a series of one second portions ("window") of the audio sample to the audio recognition service 130. Upon receipt of an audio sample, the query component can be configured to return results after only receiving a portion of the sample and while continuing to receive the remaining portions. As additional portions of the audio sample are received, the query component can continue to identify and return additional results. As the results are received by the client, they can be displayed in a manner that allows the user to identify them as additional results.

Client 120 and audio recognition service 130 can communicate in various suitable manners. In one embodiment, two concurrent HTTP connections are established between the client 120 and the audio recognition service 130 during receiving of an audio sample and performance of an audio recognition query for the sample. The two connections are described herein as a lookup connection and a results connection. In one embodiment, the lookup connection facilitates the transmission of an audio sample from the client 120 to the audio recognition service 130. The results connection, in turn, facilitates the transmission of results from the audio recognition service 130 to the client 120.

According to this aspect, in order to establish the connections, the client 120 sends a POST type request, which establishes the lookup connection, and a GET type request, which establishes the results connection. To associate the two connections, the client 120 includes identical session IDs in both the lookup and results requests. Because the requests each include the same session ID, the audio recognition service 130 is able to determine that the associated lookup and results connections correspond to one another for a particular client 120, thereby distinguishing between the various requests from any number of clients 120. In general, the session ID remains valid for the duration of the lookup connection.

As previously described, the lookup connection is used by the client 120 to transmit the audio samples to the audio recognition service. More specifically, during an audio recognition query, metadata for the audio sample as well as the audio sample itself is sent over the lookup connection. The information sent over the lookup connection can be encoded using a sequence of length prefixed protocol buffers (a form of TLV encoding). The lookup connection additionally facilitates the transmission of a final set of audio recognition results from the audio recognition service 130 to the client 120. A final set of audio recognition results can be returned to the client 120 after transmission of the audio sample has ended. By sending the final set of audio recognition results over the lookup connection, the audio recognition service 130 can indicate to the client 120 that the audio recognition query has ended.

The results connection, in general, facilitates the transmission of audio recognition results from the audio recognition service 130 to the client 120 while audio samples are still being transmitted over the lookup connection. Thus, use of the two connections allows for a 'full duplex' type of connection between the client 120 and the audio recognition service using HTTP. The results returned over the results connection can be based on the portion of the audio sample already transmitted to and processed by the audio recognition service 130. As also described above, the results connection is established by the client 120 through sending a results request. Following sending, the results request is held open until results are received, via the results connection, from the audio recognition service 130, or until the audio recognition query ends (e.g., as indicated by the return of the lookup request).

In the event results are pre-maturely received (e.g. prior to transmission of an entire audio sample), the client 120 sends another results request including the same session ID as used previously to the audio recognition service 130. In doing so, the results connection can be re-established. Subsequently identified results are thereafter received and processed over the results connection in a similar manner. Through establishing concurrent HTTP connections in the manner described herein, the audio recognition system 100 enables results to be returned from the audio recognition service 130 while an audio sample is still being transmitted to the audio recognition service 130. In doing so, the audio recognition system is able to reduce both real and user-perceived latency.

In another embodiment, an audio sample and results for the audio sample are sent over a single HTTP connection. With this embodiment, the client 120 can transmit the audio sample to the audio recognition service over a lookup connection. After transmission of the audio sample ends, the client 120 receives results from the audio recognition service 130 over the lookup connection. In contrast to the dual HTTP connection method described previously, results are not received while the audio sample is being transmitted to the audio recognition service 130.

In yet another embodiment, the audio recognition system 100 is configured to support both the single HTTP connection method and the dual HTTP connection method described herein. According to this embodiment, the client 120, the audio recognition service 130, (or some other entity) determines prior to beginning an audio recognition query whether the query is to be carried out using a single HTTP connection or two concurrent HTTP connections. For example, the audio recognition service 130 can determine that a query is to be carried out using a single HTTP connection. In the example, the client 120 continues to establish two connections with the audio recognition service 130. However, over the course of the query, the audio recognition service does not send results over the results connection. Rather, after the audio sample has been transmitted, the audio recognition service provides all of the identified results to the client 120 over the lookup connection. As another example, the client 120 can determine that a query is to be carried out using a single HTTP connection. In this example, the client 120 establishes a single connection with the audio recognition service over which the audio sample is transmitted and results returned.

Figure 2:
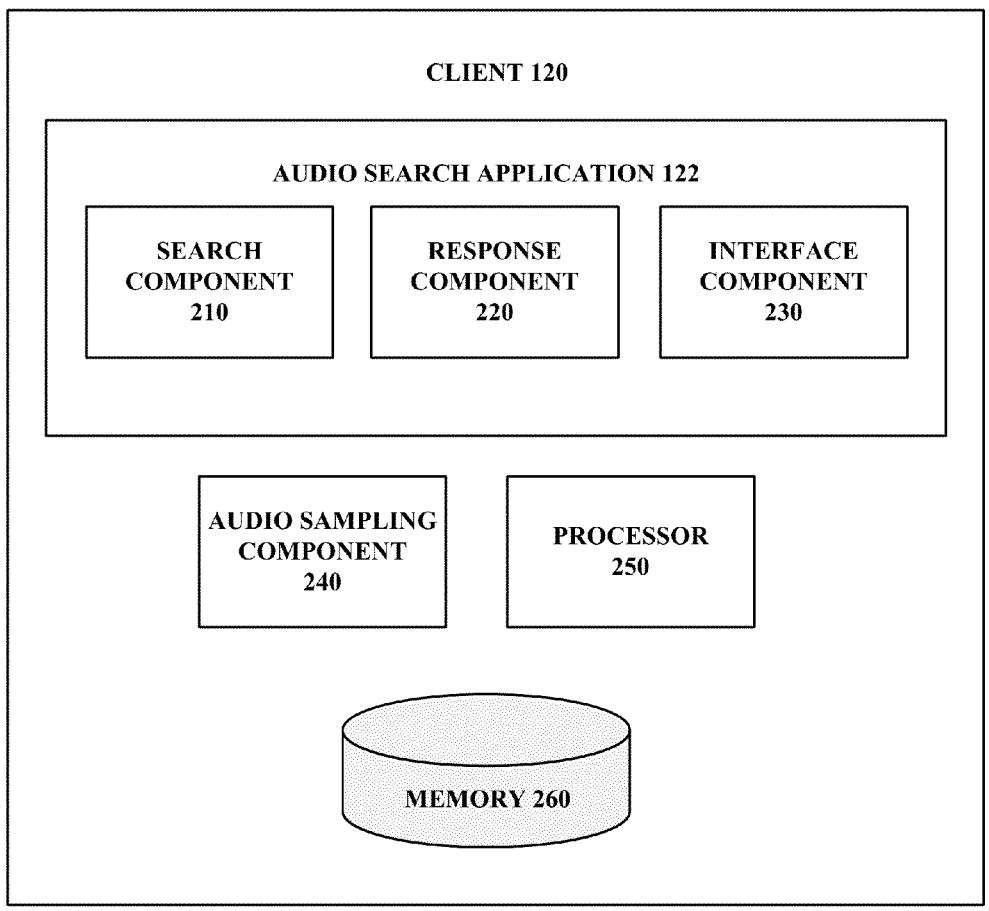
FIG. 2 is a block diagram of an example user device for use in connection with an audio recognition system in accordance with aspects described herein.

Referring now to FIG. 2, presented is an exemplary embodiment of a client device 120 for employment in association with an audio recognition service (e.g. audio recognition service 130) in accordance with aspects described herein. Repetitive description of like elements employed in respective embodiments of clients 120 described herein are omitted for sake of brevity.

Client 120 includes audio search application 122 to facilitate sending an audio sample to an audio recognition service (e.g. audio recognition service 130), receiving information about the audio sample from audio recognition service, and performing and/or receiving various responses associated with the information about the audio sample. In an aspect, audio search application can include search component 210, response component 220, and interface component 230. Client 120 can further include memory 260 for storing computer executable components and instructions. A processor 250 can facilitate operation of the computer executable components and instructions by client 120.

Client 120 can include audio sampling component 240. Audio sampling component 240 can include suitable hardware and/or software for capturing and/or recording an audio sample. For example, audio sampling component 240 can include a microphone. In some aspects, audio sampling component records an audio sample and saves the recorded audio sample in memory 260 prior to sending the audio sample to search component 210 for transmission to audio recognition service. In another aspect, audio sampling component 240 facilitates real-time or substantially real-time transmission of a captured audio sample. For example, the audio sampling component 240 can facilitate transmission of an audio sample as it is being captured. In an aspect, audio sampling component 240 can further provide playback of a captured audio sample.

The audio search application 122 includes search component 210 to facilitate processing of a captured audio sample (e.g., encoding a sample) sending the audio sample to the audio recognition service 130 for querying, and receiving information from the audio recognition service 130 based on the audio sample. In an aspect, search component 210 sends an audio sample to audio recognition service 130 in response to generation of the audio sample by audio sampling component 240. In another aspect, search component 210 sends an audio sample in response to a user initiated command to send the audio sample.

When sending an audio sample to audio recognition service, the search component 210 generates a search request indicating a request to receive a search result at least identifying the audio sample. In an aspect, the search request can further specify inherently or expressly, a request for various additional information (discussed below) associated with an identified audio sample. For example, the additional information can include information about a reward associated with the audio sample, information about checking-in for the audio sample, or information about purchasing content associated with the identified audio sample. In some aspects, a user selects information to be included in a query request and search component 210 can formulate the query request based on the selected information. In other aspects, the search component 210 can be configured to request any available information about an audio sample from audio recognition service 130.

Search component 210 further receives query results from audio recognition service 130 in response to an audio sample submission and associated search request. A query result can include a variety of information about a captured audio sample. In an aspect, a query result can include information identifying an audio sample. For example, identification information can indicate that an audio sample is from a particular song, identifying the song by name, and, optionally, identifying the artist, recording, etc. A query result can further include additional information about an identified audio sample, such as a reward associated with the identified audio sample to be earned in response to a user elected check-in for the audio sample. For example, a user can select to check-in for an audio sample or content item representative of the identified audio sample. As used herein, the term content item refers to an item (e.g., person, place, thing, or event) identified as the audio sample. For example, a content item can include a song, a person, a video, a restaurant, or a public speech. In some aspects, a single audio sample can be identified as multiple content items.

Further, additional information about an identified audio sample that can be included in a query result can include a review about the represented content object, an author or producer of the content object, articles or web pages about the author or producer, and other available information relevant to the content object. The result can further include social information for the content object, such as information regarding other users who have associated with the content object. The result can moreover include purchase information for the content object or items related to the content object.

As noted above, a query result can include a various different content items and information types. Accordingly the interface component 230 can be configured to present such results having different types in a unified manner (e.g., results of different types combined in single list) or a segregated manner (e.g., results grouped by media or content type). For example, assume an audio sample transmitted to the audio recognition service 130 is identified by the service as being part of a song played on a particular television show, with a voice over by an actor on the television show. The audio recognition service 130 can return results to the audio search application 122 including a result identifying the song by name and artist (a music type), a result identifying the television show by name and network (a television program type), and a result identifying the actor by name (a speaker identification type). The results can be shown in a single list, or grouped by type. The interface component 230 can further organize a query result based on any additional information aside from identification information included in a query result. For example, the interface component can provide a prompt to check-in for a content object of an identified audio sample, a reward associated with the check-in, and information about the reward.

In an aspect, the audio recognition service 130 is configured to provide at least a partial set of query results to the search component 210 while the audio recognition service is still processing an audio recognition query. Further, results can be received by the search component 210 as the search component 210 continues to receive an audio sample from the audio sampling component 240 and/or sends portions of the audio sample to the audio recognition service 130. The interface component 230 can display these additional results to the user as additional portions of the audio sample are transmitted to the audio recognition service 130 and results for those portions returned to the client 120. In other instances, results can be received while an audio recognition query is being performed, but not presented until the audio recognition query ends.

In various aspects, the audio search application 122 includes an interface component that enables a user to interact with the application 122. In particular, interface component 230 can include a graphical user interface that enables a user to initiate an audio recognition query via search component, view query results, an respond to query results using response component 220. For example, interface component 230 can present a query to a user in a graphical user interface. The query can include in item identified as a submitted audio sample, a reward associated with the item and a prompt to check-in for the item. The query can further include information about the reward, such as the requirements for earning the reward and a user's status with respect to earning the reward.

The audio search application 122 further enables the user, via the interface component 230, to view information regarding potential rewards associated with one or more of the returned results. These rewards can be earned in part by checking-in for a content object of a returned search result. In an aspect, the information can describe the potential rewards and the manner in which they can be earned. For example, the information can indicate that a user will receive a coupon in response to a check-in. In another example, the information can indicate that a free promotional item may be earned if a user checks-in to a particular television show three times. The audio search application 122 can further provide, via the interface component, information regarding a reward earned by a user. For example, the audio search application 122 can display a coupon code reward earned by the user.

The audio search application 122 additionally enables a user, via response component 220 to perform various actions based on a received search result. In an aspect, the response component 220 enables a user to select to check-in for a content item in a search result. Through checking-in for an item, a user can indicate that he or she is electing to associate with the item. For example, the user can indicate that he or she is currently listening to, viewing, purchasing, and/or otherwise interacting with the content item. The response component 220 can further receive reactions based on user responses. In particular, the response component 220 can receive rewards issued to a user in response to checking-in or otherwise earning the reward.

In another aspect, the response component 220 can enable a user to perform additional actions based on a search result aside from checking-in. For example, the response component can allow a user to purchase items associated with a content item. In another example, the response component 220 can allow a user to post information about the content item to a social networking site. In another example, the response component 220 can allow a user to share an identified content item.

Figure 3:
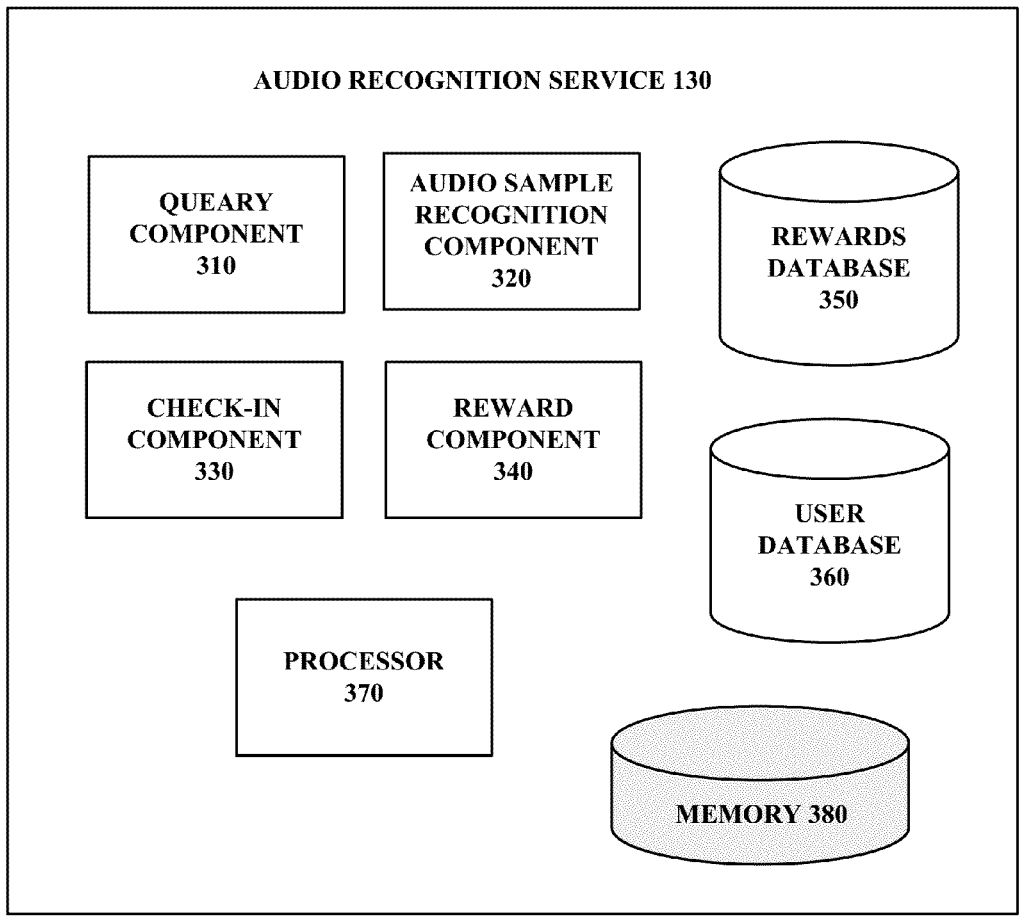
FIG. 3 is a block diagram of an example audio recognition service for use in connection with an audio recognition system in accordance with aspects described herein.

Turning now to FIG. 3, presented is a high level diagram of an exemplary audio recognition service 130 in accordance with aspects described herein. Repetitive description of like elements employed in respective embodiments of audio recognition service 130 described herein are omitted for sake of brevity. Audio recognition service 130 includes query component 310, audio sample recognition component 320, check in component 330, reward component 340, rewards database 35 and user database 360. Audio recognition service 130 can further include memory 380 for storing computer executable components and instructions. A processor 370 can facilitate operation of the computer executable components and instructions by audio recognition service 130.

In an aspect, audio recognition service 130 can tailor services to individual users. For example, audio recognition service can log a user's earned rewards and/or actions taken by the user toward earning a reward. According to this aspect, user's can register and/or set up a profile with audio recognition service 130 that can be stored by audio recognition service in a user database 360. The user database 360 can store login credentials for users, such as usernames, passwords, and/or the like. The user database 360 can additionally store historical information for the users, such as the content items representative of audio samples to which the users have previously checked-in. The user database 360 can additionally store information regarding rewards previously earned by a user.

Query component 310 is configured to receive information from a client, oversee processing of the information by audio recognition service 130, and provide information back to the client based on the processing. In particular, query component 310 is configured to receive an audio sample from a client and generate a query result for the received audio sample. Query component 310 can optionally receive information identifying a particular user or client device associated with the user, issuing a query request for an audio sample.

A query result generated by query component 310 can include a various types of information about the audio sample. For example, a result can include identification information, such as identification information indicating that an audio sample is from a particular song, identifying the song by name, and, optionally, identifying the artist, recording, etc. The result can further include non-identification information for the song, such as reviews of the song or the artist, articles or web pages about the artist, tour dates for the artist, and other available information relevant to the song. The result can further include social information for the song, such as information regarding other users who have listened to the song or like the song. The result can moreover include purchase information for items related to the song, such as a digital copy of the song, merchandise related to the song or artist, etc. Identified results can be provided back to the requesting client for display in an integrated user interface via the audio search application.

In an aspect, the query result can include information identifying an audio sample as well as a reward associated with an identified audio sample to be earned in response to a user elected check-in for the audio sample. As noted above, audio recognition service 130 enables a user to check-in to a content item indicated by a query result and provide a reward in response to the check-in. For example, a user can provide a check-in to a particular song, which indicates that the user is currently listening to the song. As another example, a user can check-in to a restaurant, which indicates that the user is currently having a meal at the restaurant. In an aspect, responsive to the check-in event, audio recognition service 130 can render the associated reward. In another aspect, responsive to a check-in, the audio recognition service 130 can cause a post to be published to a user's profile (e.g., a social network profile). The post can indicate, for example, that the user is currently listening to the content item (e.g., a song), likes the content item, has purchased or downloaded the content item, or the like.

During an audio recognition query, the query component receives an audio sample and optionally user identification information from a client. As an audio sample is transmitted from a client to the query component 310, the query component 310 distributes the audio sample to the audio recognition component 320 for identification. Upon receipt of an identified audio sample, the query component can generate a query result with the audio sample identification information and optionally the additional information associated with the identified audio sample listed above.

In an aspect, audio sample recognition component identifies 320 the audio sample using one or more audio recognizers and provides the results to the query component 310. In particular, the audio recognition component is configured to identify an audio sample results across multiple content types (e.g., music types, television program types, etc). For example, the audio recognition service 100 can be configured to identify whether an audio sample is from a song, a television show episode, a background noise and/or a famous speech. In some aspects, an audio sample can include multiple identification classifications as a result of the multiple audio identifiers. According, a query result can include multiple identifications for a single audio sample. For example, an audio sample of an actor singing song "1, 2, 3" in movie "ABC" may be identified as the actor, the song "1, 2, 3," or the movie "ABC." Audio recognition sample recognition component 320 is described in greater detail with respect to FIG. 4.

In order to generate the information to associate with an identified audio sample, including check-in associations, reward information, review information, social media information, purchase information and etc. the query component 310 can employ both internal and external sources. For example, as described below, rewards database 360 can store information associating check-in options and/or rewards with content items represented by audio sample. In an aspect, the non-identification information can be retrieved by query component 310 from publically accessible data sources, such as websites, blogs, magazines, online periodicals, etc. The social information can be retrieved from social networking services and/or other social media.

In an aspect, query component 340 can employ reward component 340 to identify rewards associated with an identified audio sample. Information regarding identified potential rewards is used by the query component 310 and included in a query result sent to a client. The reward component is configured to identify potential rewards associated with an identified audio sample and dispense rewards earned by a user. In particular, the reward component 340 receives information identifying audio recognition results from the query component 310 and/or the audio sample recognition component 320. Based on the identified results, the rewards component 320 identifies any potential rewards associated with any of the results. The information regarding the potential rewards can be provided for display to a user in order to indicate the manner in which a specific reward can be earned. For example, a reward may be fashioned to be earned in response to checking-in for an audio sample. In another example, a reward may be fashioned to be earned after completing a pre-determined number of checking-in events. According to this example, a user may receive points for checking-in for a series of audio samples respectively associated with a series of items or events. Once a user receives the pre-determined number of points, the user can earn the reward.

In an aspect, reward component 340 is configured to determine whether an identified audio sample is associated with a check-in event. As noted above, a check-in for an audio sample is a user elected association with the audio sample. Thus reward component 340 can determine whether a user can check-in for an identified audio sample. When an identified audio sample is associated with a check-in event, the query component 310 can associate the check-in event with the audio sample in a query result provided to a client. Upon receipt of the query result, a user can see what the identified audio sample is and elect to check-in for the audio sample. In another aspect, the reward component 340 can determine whether the check-in association for the audio sample is associated with a reward. For example, an identified audio sample can be associated with a check-in that provides a user with a coupon or a badge to be earned in response to checking in. In some aspects, the a check-in association and a reward association for an identified audio sample are mutually inclusive. In other words, an audio sample will not be associated with a check-in event unless a reward is associated with the check in event. In other aspects, an audio sample can be associated with a check-in event where a reward is not provided.

In an aspect, audio samples are associated with check-in events and/or rewards in a stored look-up table. For example, the look-up table can be internally stored in a rewards database 350 and/or externally accessible. According to this aspect, reward component 340 can determine whether a check in event and/or reward is associated with an identified audio sample by employing the look-up table. In an aspect, the look-up table can reference a content item representative of an identified audio sample or set of related content items, a reward type, reward criteria, a reward expiration date or date range, and/or the like. The information populating the rewards database can be obtained from one or more sources, such as advertisers, retailers, and/or the like. Illustratively, a server of a retailer may periodically upload or otherwise electronically provide rewards information to the rewards database 350.

Check-in component 330 is configured to receive and process check-in selections from a client. A check-in selection indicates that a user wishes to check-in to a particular content item representative of an identified audio sample presented to the user in a query result. In an aspect, the check-in component forwards check-in selections to the reward component 340 and receives information regarding any rewards earned by a user. The rewards information is thereafter provided to the client 120. In an aspect, the check-in component 340 causes information regarding a received check-in selection to associated with the user's profile in user database 360. For example, the check-in component 330 can access user database 360 to update a user's current check-in count for a particular television show series. The check-in component 330 can further cause information regarding a received check-in selection to be published to one or more services. For example, the check-in component 330 can provide check-in information to a social network in order to have a post about the check-in selection published to a user's social network profile. The one or more services can be those services which the user has authorized that may receive his or her check-in information.

The reward component 340 can additionally, responsive to a received check-in by check-in component, determine whether a user is currently eligible for a reward. For example, a user may become eligible for a reward after checking-in to a particular television show after a total of five times. In order to determine whether a user is eligible for a reward, the rewards component can access historical information for the user stored in the user database 360. The historical information can indicate that the user has already checked-in to the television show series four times. Based on this information, the reward component 340 can determine that the user currently needs to check-in one additional time before becoming eligible for the reward. This information can further be provided to a user in a query result.

The reward component 340 is further configured to dispense or provide rewards to user's when the user has met criteria for receipt of the reward (e.g. completed a check-in event or earned completed a series of check-in events). The reward component 340 can further generate or dispense a reward in any suitable manner. For example, the reward component can generate a coupon code usable by the user to purchase items from an electronic marketplace. As another example, the reward component 340 can send a request to a social network indicating that a virtual badge be displayed on the user's social network profile.

Figure 4:
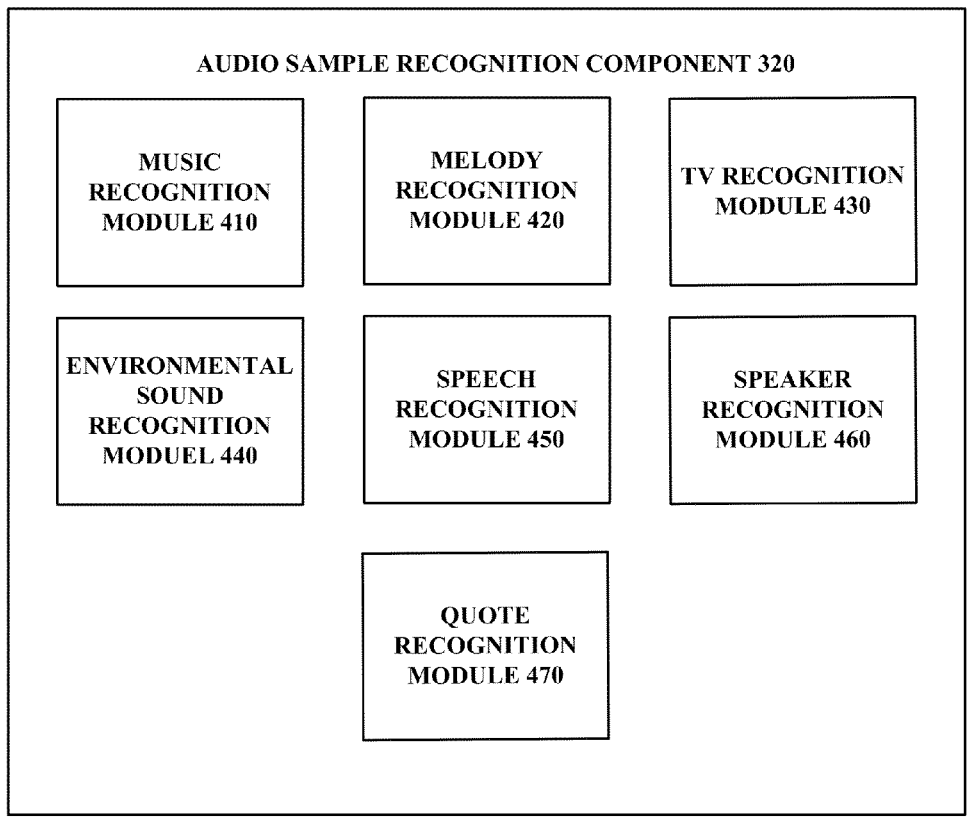
FIG. 4 is a block diagram of an example audio sample recognition component of an audio recognition service for use in connection with an audio recognition system in accordance with aspects described herein.

FIG. 4 presents an example embodiment of an audio sample recognition component 320 in accordance with aspects described herein. Repetitive description of like elements employed in respective embodiments of the audio recognition module 320 described herein are omitted for sake of brevity. Audio sample recognition component 320 includes multiple modules configured to operate as different types of audio recognizers.

In this description, the term "module" refers to computational logic for providing the specified functionality. A module can be implemented in hardware, firmware, and/or software. It will be understood that the named modules described herein represent one embodiment of the present invention, and other embodiments may include other modules. In addition, other embodiments may lack modules described herein and/or distribute the described functionality among the modules in a different manner. Additionally, the functionalities attributed to more than one module can be incorporated into a single module. Where the modules described herein are implemented as software, the module can be implemented as a standalone program, but can also be implemented through other means, for example as part of a larger program, as a plurality of separate programs, or as one or more statically or dynamically linked libraries. In any of these software implementations, the modules are stored on the computer readable persistent storage devices of the audio recognition service 130, loaded into memory, and executed by the one or more processors of the service's servers.

The recognition modules 410-470, in general, perform the task of audio recognition. Typically, the recognition modules 410-470 each individually process an audio sample several times during an individual audio recognition query. In one implementation, the processing performed by each individual recognition module is based on the portion of the audio sample transmitted to the module up to that point. As an example, a recognition module may have received the first two seconds of an audio sample at a first point in a query. As such, the results identified by the recognition module would be based on the two second portion received up to the first point. At a second point in the query, the recognition module may have since received the following three seconds of the audio sample. As such, the results identified by the recognition module would be based on the five second portion received up to the second point.

In another implementation, each processing is based on the portion of the audio sample yet to be processed by the recognition module. For example, a recognition module may have received the first four seconds of an audio sample at a first point. As such, the results identified by the recognition module would be based on the four second portion received up to the first point. At a second point, the recognition module may have since received (but not processed) the next five seconds of the audio sample. In this implementation, the results identified by the recognition module at the second point would be based only on the five second portion of the audio sample yet to be processed.

In one implementation, an individual recognition module can be configured to send results to the query component 310 as the results are identified. Alternatively, a recognition module can be configured to send results to the query component 310 in periodic batches. It should be appreciated that each recognition module can be configured to send results in a different manner (e.g., as results are identified or in batch) and/or at different times from another recognition module. In one implementation, the query component 310 can receive results prior to distributing an entire audio sample to the recognition modules 410-470. In such implementations, the results received from the recognition modules 410-470 are based on a portion of the entire audio sample. As additional portions of the audio sample are distributed to the recognition modules, the query component 310 can concurrently receive additional or updated results from the recognition modules 410-470.

The query component 310 can combine, filter, or otherwise alter results received from the recognition modules 410-470. The query component 310 can alter the results using any suitable preferences or criteria. For example, the query component 310 can filter out duplicate results. For example, during an audio recognition query, the music recognition module 410 and the melody recognition module 420 may both determine that an audio sample is from a particular song. Rather than having two results indicating the same song, the query component 310 combines the results. The query component 310 can further delay from sending, to the client 120, any results returned from the recognition modules 410-470. For example, the query component 310 can be configured to send results every five seconds to a client. As such, during each five second period, the query component 310 can receive, but not send results. At the end of each five second period, the query component 310 can then send the results in a batch.

The music recognition module 410 is configured to process an audio sample in order to determine whether the audio sample is associated with a particular item of music (e.g., a song), and is one means for performing this function. In particular, the music recognition module 410 can determine whether the audio sample is an exact or near match for at least a portion of an item of music. In one embodiment, the music recognition module 410 includes a database (not shown) of reference audio fingerprints. The reference audio fingerprints can be generated by the music recognition module 410 or obtained from another source. Each fingerprint in the database contains characteristic information about a music item, and can be used to identify the music item. Upon receiving an audio sample (either a portion of or in its entirety), the music recognition module 410 generates a fingerprint for the audio sample. After generating the fingerprint, the music recognition module 410 attempts to match the fingerprint for the audio sample with a fingerprint stored in the database of reference audio fingerprints. If a match is located, the music recognition module 410 provides a result to the query component 310. If a match is not located, the music recognition module 410 does not provide an indication to the query component 310.

When matching fingerprints, the music recognition module 410 is configured to tolerate an amount of noise in the fingerprint generated from the audio sample. For example, the audio sample may include distortions introduced by the microphone that recorded the sample and/or noise from the environment. As such, two fingerprints are considered a match if the two fingerprints are the same to within a degree of tolerance as determined by the music recognition module 410. The manner in which fingerprints are generated and matches determined can be based on any suitable technique, such as the techniques described in S. Baluja, M. Covell, "Content Fingerprinting Using Wavelets", *Visual Media Production*, 2006; Cano et al., "A Review of Algorithms for Audio Fingerprinting", 2002 *IEEE Workshop on Multimedia Signal Processing*, 2002; Haitsma and Kalker, "A Highly Robust Audio Fingerprinting System", *International Symposium on Music Information Retrieval*, 2002.

The melody recognition module 420 is configured to process a received audio sample in order to determine whether the audio sample is associated with a particular melody, and is one means for performing this function. In particular, the melody recognition module 420 can determine whether the melody of the audio sample matches a portion of a particular music item. For example, the melody recognition module 420 may determine that a melody hummed by a person in the audio sample is from the song "Jingle Bells". In one embodiment, the melody recognition module 420 includes a database (not shown) of reference intervalgram fingerprints created from a set of music items. The reference intervalgram fingerprints may be generated by the melody recognition module 420 or obtained from another source. Upon receiving an audio sample (either a portion of or in its entirety), the melody recognition module 420 generates an intervalgram fingerprint for the audio sample. The melody recognition module 420 then accesses the database of reference intervalgram fingerprints to locate a match for the intervalgram fingerprint of the audio sample. If a match is found, the melody recognition module 420 provides a result to the query component 310. If a match is not found, the melody recognition module 420 does not provide an indication to the query component 310. Further details regarding melody recognition based on intervalgram representations are set forth in U.S. application Ser. No. 12/826,623, which is incorporated by reference herein.

The TV recognition module 430 is configured to process a received audio sample in order to determine whether the audio sample is associated with a particular television show episode, and is one means for performing this function. In particular, the TV recognition module 430 can determine whether the audio sample exactly or very closely matches a portion of a television show episode's audio. In one embodiment, the TV recognition module 430 can match an audio sample using a technique similar to the technique described previously for the music recognition module 410. However, rather than using reference fingerprints derived from music items, the reference fingerprints are derived from the audio of a set of television show episodes.

The environmental sound recognition module 440 is configured to process a received audio sample in order to identify a source of the audio sample as being an environmental source, and is one means for performing this function. For example, the environmental sound recognition module can determine that the audio sample was generated by a particular animal (a bird, a lion, a whale), natural phenomena (e.g., rainstorm, lighting, waterfall), an urban sound source (e.g., an automobile horn, a bus, an airplane), or the like. In one embodiment, the environmental sound recognition module 440 includes a database (not shown) of reference audio representations created from a set of environmental sound samples. The reference audio representations may be generated by the environmental sound recognition module 440 or obtained from another source. Upon receiving an audio sample (either a portion of or in its entirety), the environmental sound recognition module 440 generates an audio representation for the audio sample. The environmental sound recognition module 440 then accesses the database of reference audio representations to locate a match for the audio representation of the audio sample. If a match is found, the environmental sound recognition module 440 provides a result to the query component 310. If a match is not found, the environmental sound recognition module 440 does not provide an indication to the query component 310. The manner in which audio representations are generated and matches determined can be based on any suitable technique, such as the technique described in R. Lyon, M. Rehn, S. Bengio, T. Walters, G. Chechik, "Sound Retrieval and Ranking Using Sparse Auditory Representations", *Neural Computation*, 2010.

The speech recognition module 450 is configured to process a received audio sample in order to determine whether the audio sample includes speech, and is one means for performing this function. The speech recognition module 450 thereafter transcribes any identified speech into text. Transcription of an audio sample can be performed using any suitable technique, such as the technique described in M. Mohri, Fernando Pereira, Michael Riley, "Speech Recognition with Weighted Finite-State Transducers", *Spring Handbook on Speech Processing and Speech Communication*, 2008.

The speaker recognition module 460 is configured to process a received audio sample in order to determine the identity of a speaker of the audio sample, and is one means for performing this function. For example, the speaker recognition module 460 can identify that a speaker is a particular individual, such as a well known individual (e.g., Julia Roberts). In one embodiment, the speaker recognition module 460 includes a database (not shown) of reference speaker representations created from a set of speech samples. The reference speaker representations may be generated by the speaker recognition module 460 or obtained from another source. Upon receiving an audio sample (either a portion of or in its entirety), the speaker recognition module 460 generates a speaker representation for the audio sample. The speaker recognition module 460 then accesses the database of reference speaker representations to locate a match for the speaker representation of the audio sample. If a match is found, the speaker recognition module 460 provides a result to the frontend module 460. If no match is found, the speaker recognition module 460 does not provide an indication to the query component 310. The manner in which speaker representations are generated and matches determined can be based on any suitable technique, such as the technique described in A. Dehak, P. Kenny, R. Dehak, P. Dumouchel, P. Ouellet, "Front-End Factor Analysis for Speaker Verification", *IEEE Transactions on Audio, Speech and Language Processing*, 2011.

The quote recognition module 470 is configured to process a received audio sample in order to determine whether the audio sample is associated with a famous or well-known quote. For example, the quote recognition module 470 can determine that a quote was spoken by Martin Luther King, Jr. In one embodiment, the quote recognition module 470 can match the audio sample using a technique similar to the technique described previously for the music recognition module 410. However, rather than using reference fingerprints derived from music items, the reference fingerprints are derived from audio recordings of a set of quotes (e.g., a recording of Martin Luther King, Jr. reciting his "I Have a Dream" speech).

It should be appreciated that while the audio sample recognition component 320 is shown as including only the recognition modules 410-470, any suitable number of different recognition modules can be included. For example, the audio sample recognition component 320 can include a movie or film recognition module for identifying movies associated with an audio sample. As another example, the audio sample recognition component 320 can include an associated media recognition module for identifying media frequently associated with an audio sample (e.g., a video of a wedding can be identified based on an audio sample of Pachelbel's "Canon in D.").

Figure 5:
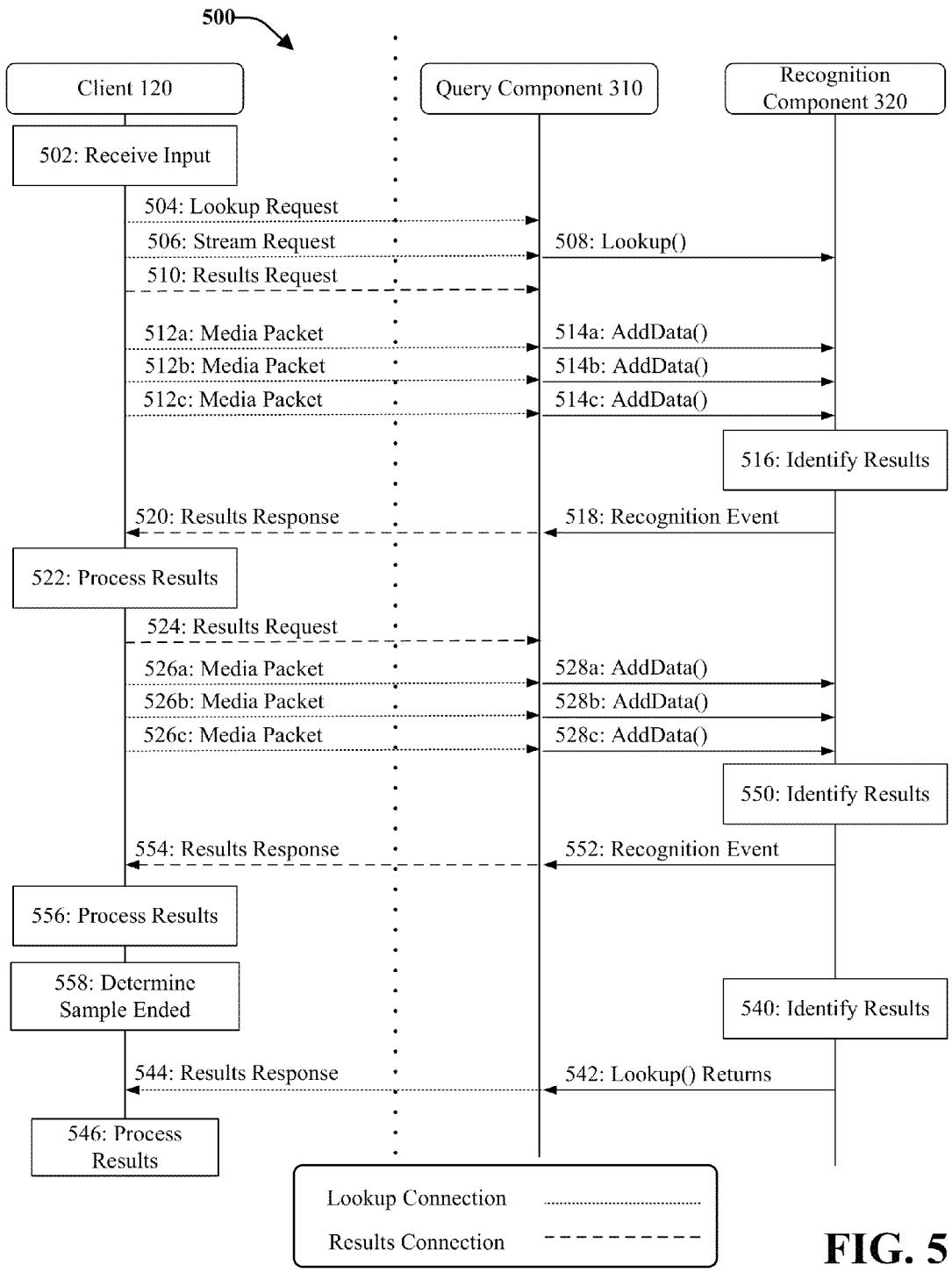
FIG. 5 illustrates an interaction diagram showing a method for processing an audio sample using two concurrent connections in accordance with aspects described herein.

Referring now to FIG. 5, presented is an interaction diagram showing an example method 500 for processing an audio sample using two concurrent connections in accordance with aspects described herein. One or more steps of process 500 can be performed in a different sequence. Moreover, other embodiments can include additional and/or different steps than the ones presented in process 500.

As shown in FIG. 5, the client 120 communicates with the query component 310 via two concurrent HTTP connections (the lookup and results connection). The query component 310, in turn, makes remote procedure calls (RPCs) to a recognition component 320 in order to process a transmitted audio sample. Recognition component 320 can include multiple recognition module to facilitate identifying audio samples of various content types. By communicating with several different recognition modules, results can be concurrently identified across several content types.

In process 500, the client 120 begins by receiving 502 an indication from a user to initiate an audio recognition query. For example, the user may select a "click to listen" button presented on a user interface of the client 120 to provide such an indication. Upon receiving the indication, the client 120 establishes a lookup connection with the query component 310 by sending 504 a POST request to the frontend module. The lookup request includes identification information (e.g., a client identifier, a username, a password, etc.), client version information (e.g., an operating system version, a device model version, etc.), a session ID for the lookup connection, etc. After sending the lookup request, the client 120 sends 506 a transmission request to the query component 310 via the lookup connection. The transmission request includes header information for the audio sample to be transmitted as well as the audio sample's type (e.g., the format in which the audio sample is encoded). For example, the transmission request can include information indicating that the audio sample was encoded using the Vorbis codec.

After receiving the transmission request from the client 120, the query component 310 sends 508 a lookup( ) call to the recognition component 320. The lookup( ) call can be a remote procedure call. The query component 310 can send the lookup( ) call to one or more recognition modules of the recognition component 320. For example, the query component 310 can send the lookup( ) call to the music recognition module 410, the melody recognition module 420, the television recognition module 430, the environmental sound recognition module 440, the speech recognition module 450, the speaker recognition module 460, and the quote recognition module 470. Through invoking the lookup( ) call, the query component 310 indicates to each recognition module that an audio sample is to be processed for recognition. The set of recognition modules can be selected in any suitable manner. For example, the query component 310 may receive a communication from the client 120 indicating that only music and television shows be identified. As such, the query component 310 may send lookup( ) calls only to the music recognition module 410, the melody recognition module 420, and the television recognition module 430. As another example, the query component 310 may again receive a communication from the client 120 indicating that only music and television shows be identified. The query component 310 may send lookup( ) calls to each of the backend modules along with indications that only music and television show results be returned. Each backend module can thereafter determine whether it is capable of returning music or television show results. Those backend modules capable of doing so can proceed with processing a received audio sample.

In addition to establishing the lookup connection, the client 120 establishes the results connection by sending 510 a results request to the query component 310. The results request includes, among other information, the same session ID used for the lookup connection. Following establishment of the lookup and results connections, the client 120 transmits 512 media packets to the query component 310. As shown in process 500, the media packets are sent via the lookup connection. Each media packet can include a segment of the audio sample to be identified. For example, each media packet can include 0.5 second segments of the audio sample. Media packets can be sent to the query component 310 as the client 120 records and encodes the audio sample. Upon receiving each media packet, the query component 310 forwards 514 the audio sample segments to the selected recognition module for processing. In particular, the received audio sample segments are forwarded by the query component 310 through invoking AddData( ) calls in the recognition module. The AddData( ) calls can be remote procedure calls.

The recognition component 320 then identifies 516 a set of results based on the received audio sample segments. Each result can include information regarding, for example, the identity of the audio sample. For example, assume the recognition module is the television recognition module. In that case, the audio sample may be identified as being from a particular television show episode. A corresponding result may include the series name, episode title, and production number for the television show episode. As another example, an audio sample may be identified as being generated by a particular species of bird. A corresponding result may include the bird's common name, scientific name, and/or the like. After identifying any results, the recognition component 320 sends 518 a recognition event to the query component 310. The recognition event can include the results identified by the recognition component 320. It should be appreciated that the recognition event need not be sent by a recognition module at the same time other recognition events are sent by other recognition modules. Rather, each recognition module can send a recognition event at different times during a query.

Upon receiving a recognition event, the query component 310 sends 520 a results response to the client 120 via the results connection. The results response includes the results received from the recognition component 320, including results from individual recognition modules. In one implementation, the query component 310 sends a results response to the client 120 as results are received from individual recognition modules of recognition component 320. In another implementation, the query component 310 batches the results received from the recognition modules prior to sending the results to the client 120. In such an implementation, the query component 310 waits a predefined interval in which results can be received from a recognition module. Results received during the interval period are batched and sent to the client 120. Results received subsequent to the interval can be sent in later batches to the client 120.

After receiving the results response, the client 120 processes 522 the results included in the response. As part of the processing, the client 120 displays the results to its user via a user interface. The displayed results can include results having multiple content types. For example, a first result can reference a television show episode. A second result can reference a song. Following processing, the client 120 sends 524 another results request to the query component 310.

The client 120 further transmits 526 additional media packets to the query component 310 via the lookup connection. Each additional media packet can include an additional segment of the audio sample to be processed for identification. The additional audio segments can sequentially follow the audio segments previously sent to the query component 310 in the audio sample. Upon receiving the additional media packets, the query component 310 forwards 528 the audio sample segments of the media packets to the recognition component 320 for processing. In particular, the received audio sample segments are forwarded by the query component 310 through invoking AddData( ) calls in the selected recognition module.

Subsequent to receiving the audio sample segments, the recognition component 320 identifies 530 a set of additional results. The additional results can be based at least in part on the additional audio sample segments. After identifying any additional results, the recognition component 320 sends 532 a recognition event to the query component 310. Responsive to receiving the recognition event, the query component 310 sends 534 a results response to the client 120 via the results connection. The results response includes the additional results. The client 120 subsequently processes 536 the results and presents the results to its user. The additional results can presented along with the previously received results.

In the example process 500 shown in FIG. 5, the client 120 determines 538 that transmitting of the audio sample is to be terminated. The client 120 can make such a determination in any suitable manner. For example, the client 120 may be configured to limit the duration of the audio sample to fifteen seconds. Thus, after transmitting an audio sample for that duration, the client 120 ceases transmitting to the query component 310. As another example, the client 120 may receive an indication from the user to end transmitting.

In one implementation, the client 120 automatically sends a message or some other indicator to the query component 310 indicating that transmission of the audio sample has ended. In another implementation, the client 120 does not provide a specific indication to the query component 310. Rather, the query component 310 determines that transmitting has ended after waiting a timeout period during which no additional media packets are received.

Following termination, the recognition component identifies 540 any remaining results. Thereafter, the lookup( ) call 542 returns with any remaining results. The remaining results are forwarded 544 to the client 120, which processes the results. As shown in process 500, the remaining results are sent via a results response over the lookup connection. Once the remaining results are received, the client 120 processes 546 the results. In particular, the client 120 displays a final set of results including the remaining results to the user via the user interface.

Figure 6A:
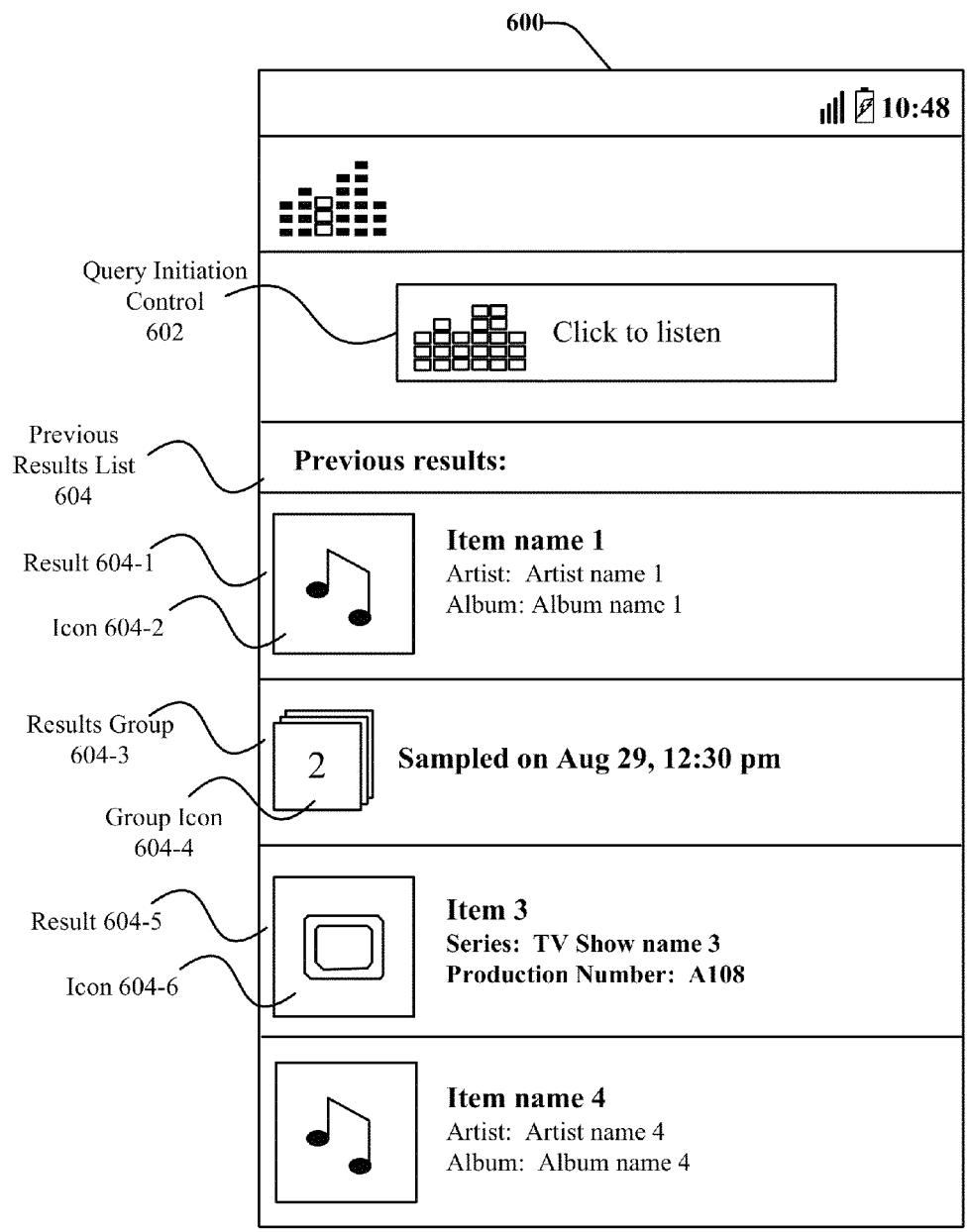
FIGS. 6A-6F illustrate a user interface for supporting audio recognition in accordance with aspects described herein.
Figure 6B:
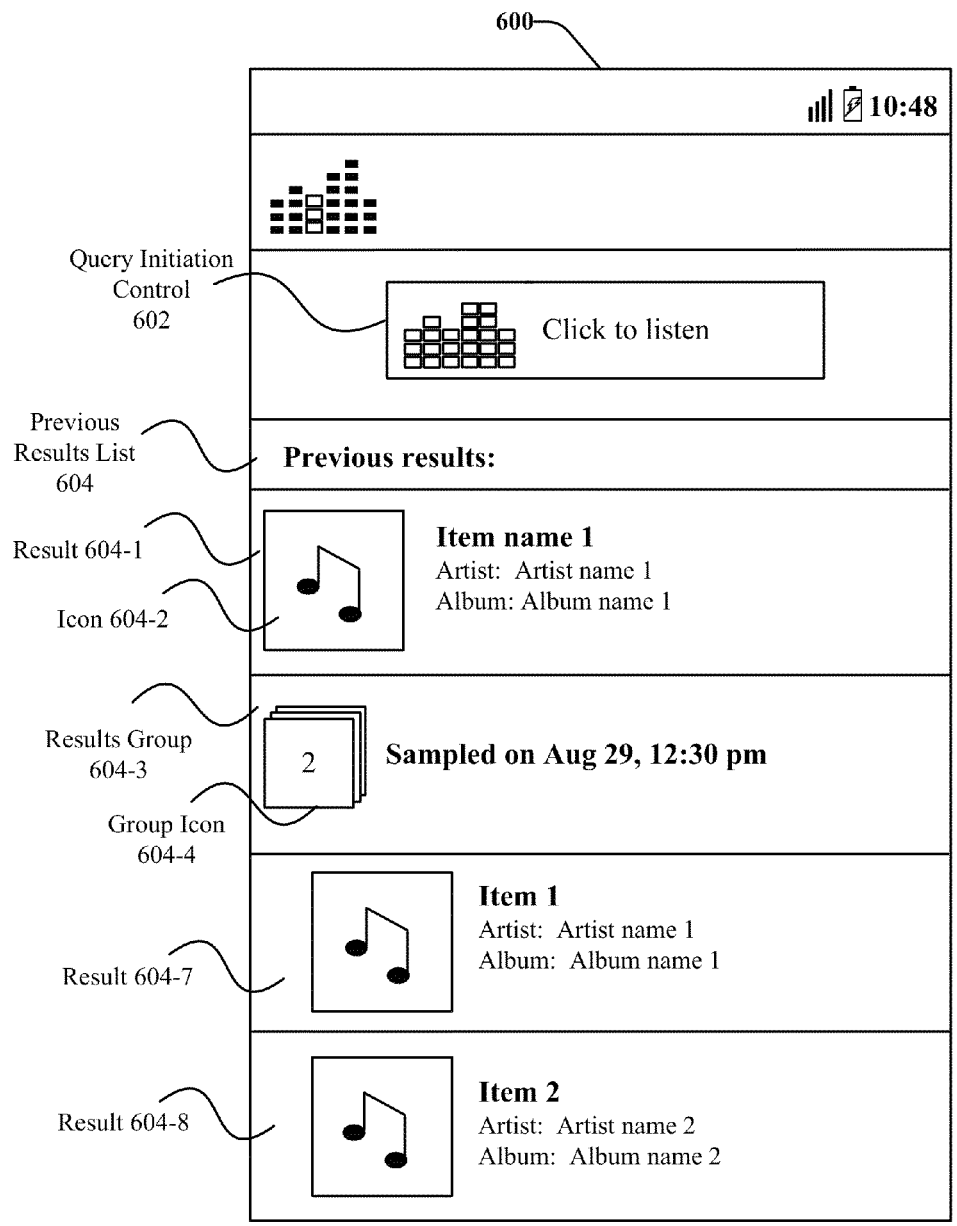

FIGS. 6A-6F illustrate a user interface 600 for supporting audio recognition in accordance with one embodiment. The user interface 600 can be displayed by an audio search application (e.g. application 122) on a client device. FIGS. 6A and 6B illustrate the user interface 600 prior to initiation of an audio recognition query. As shown in FIG. 6A, the user interface 600 includes a query initiation control 602 and a previous results list 604. The query initiation control 602 enables a user to start an audio recognition query. In particular, by selecting the query initiation control 602, the user can cause the client 120 to begin the live recording of an audio sample. As the audio sample is recorded, the client 120 transmits the audio sample to the audio recognition service 130.

The previous results list 604 includes results returned during previously performed audio recognition queries. The results populating the previous results list 604 can have different content types. For example, in FIG. 6A, the previous results list 604 includes the result 604-1, which is associated with a music type, and the result 604-5, which is associated with a television program type. Each result's content type can be indicated by a visual indicator. Illustratively, the music type for the result 604-1 is indicated by an icon 604-2 portraying a musical note. The television program type for the result 604-5 is indicated by an icon 404-6 portraying a television set.

As further shown in FIG. 6A, each result includes information specific to its content type. For example, the result 604-1 includes artist and album information. In contrast, the result 604-5 includes series name and production number information. A user can select a result from the previous results list 604 to obtain additional information about the result. For instance, by selecting the result 605-5, the user may be presented with a synopsis of the television show indicated by the result. In one embodiment, the information presented can include offers to purchase items. For example, by selecting a result referencing a television show episode, the user may be presented, via the user interface, with an offer to purchase a digital copy of the episode from an electronic marketplace.

Figure 6C:
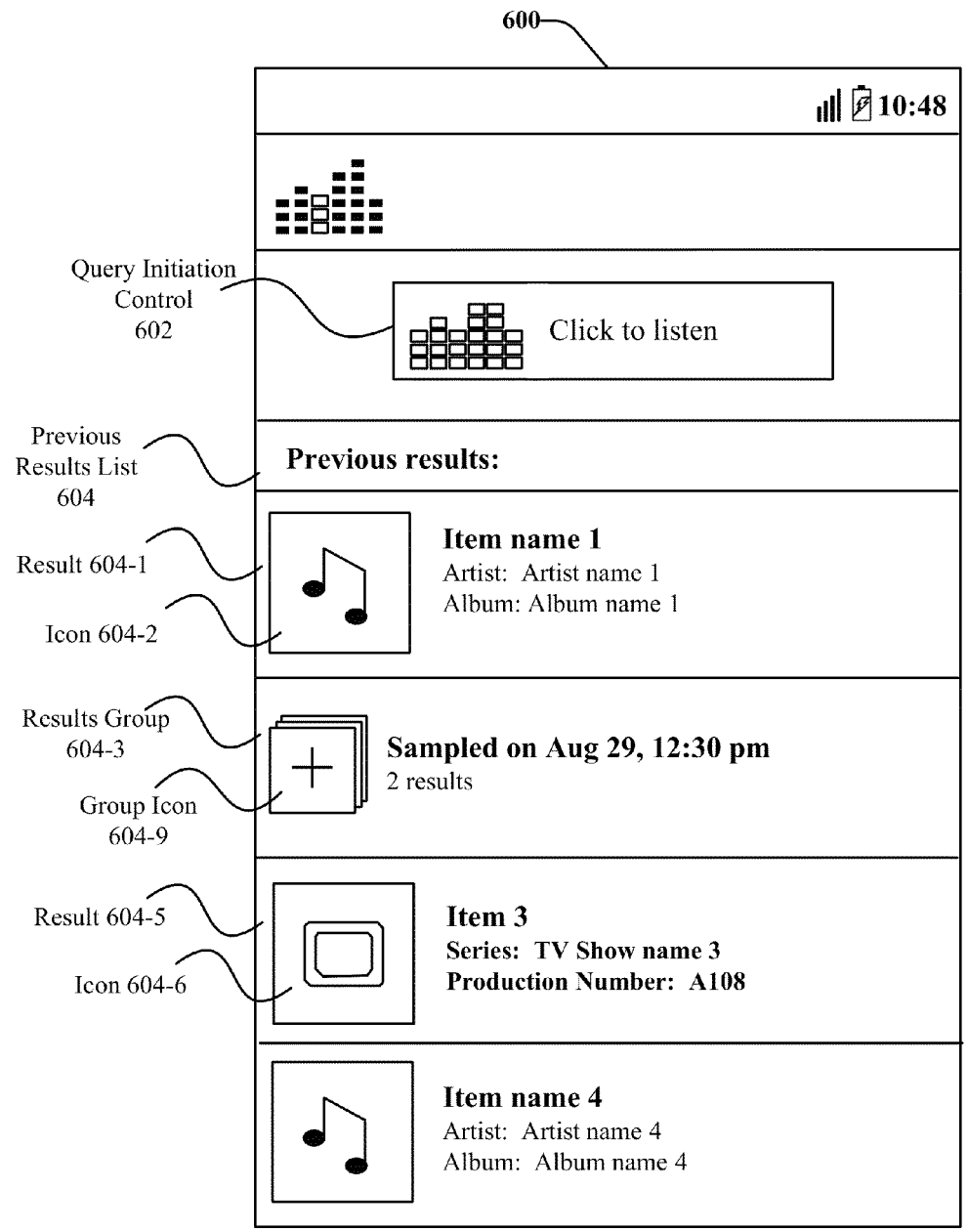
Figure 6D:
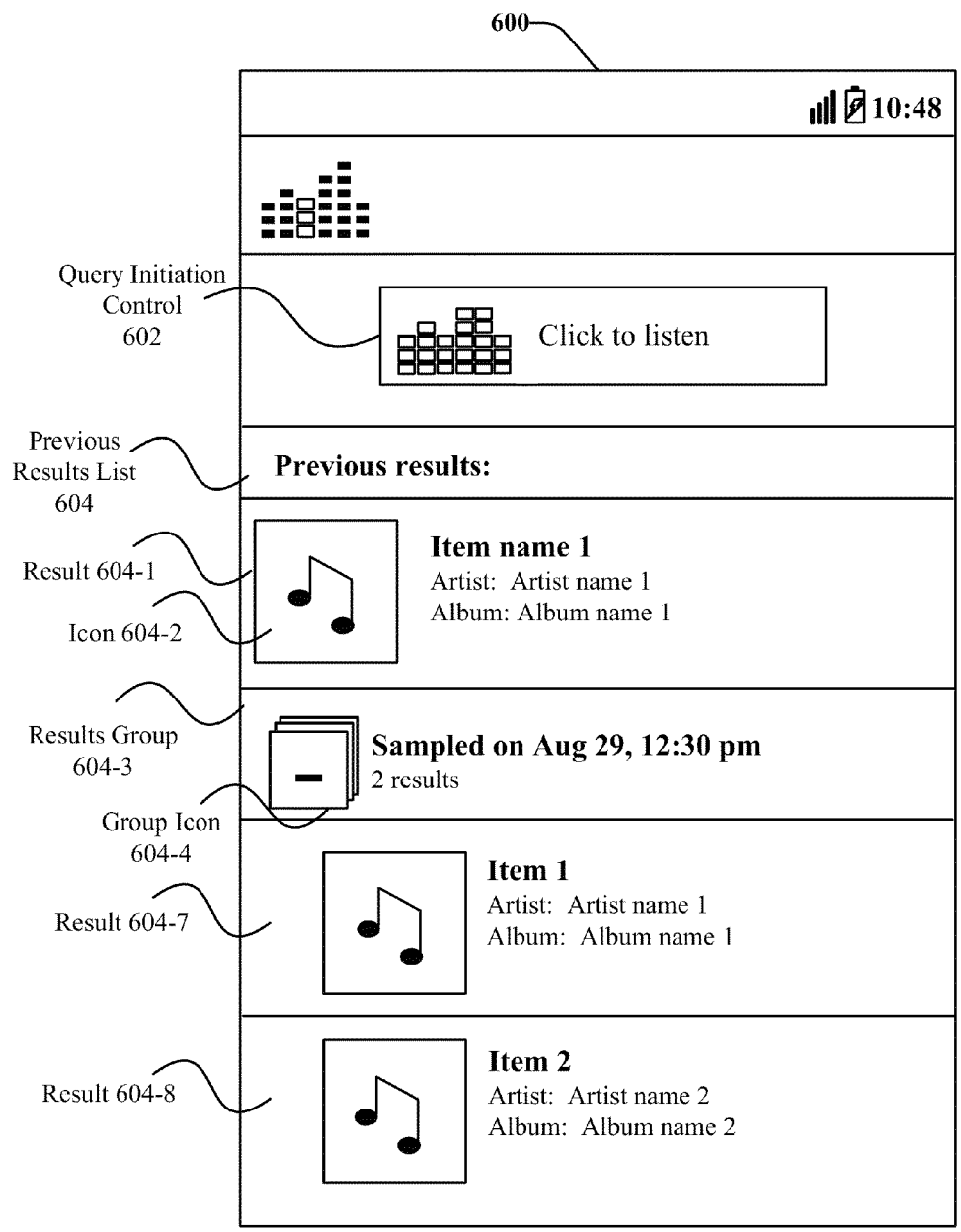

Results from the same audio recognition query can be grouped together. For example, as shown in FIG. 6A, results group 604-3 indicates that two results were returned during an audio recognition query performed on August 29 at 12:30 pm. In particular, the group icon 604-4 indicates a "2", which is the number of results in the group. In FIG. 4B, the results group 604-3 has been selected (e.g., through clicking on the icon 604-4). As a result of the selection, the results 604-7 and 604-8 (which are part of the results group 604-3) can appear in the previous results list 604. By grouping results in this manner, the user interface 600 enables users to more easily browse the previous results list 604. FIGS. 6C and 6D are similar to FIGS. 6A and 6B. However, in FIGS. 6C and 6D, the results group 604-4 includes a group icon 604-9 that portrays either a plus or a minus sign. In particular, when the results associated with the results group 604-4 are hidden, the group icon 604-9 portrays a plus sign. When the results associated with the group 604-4 are visible, the group icon 604-9 can portray a minus sign.

Figure 6E:
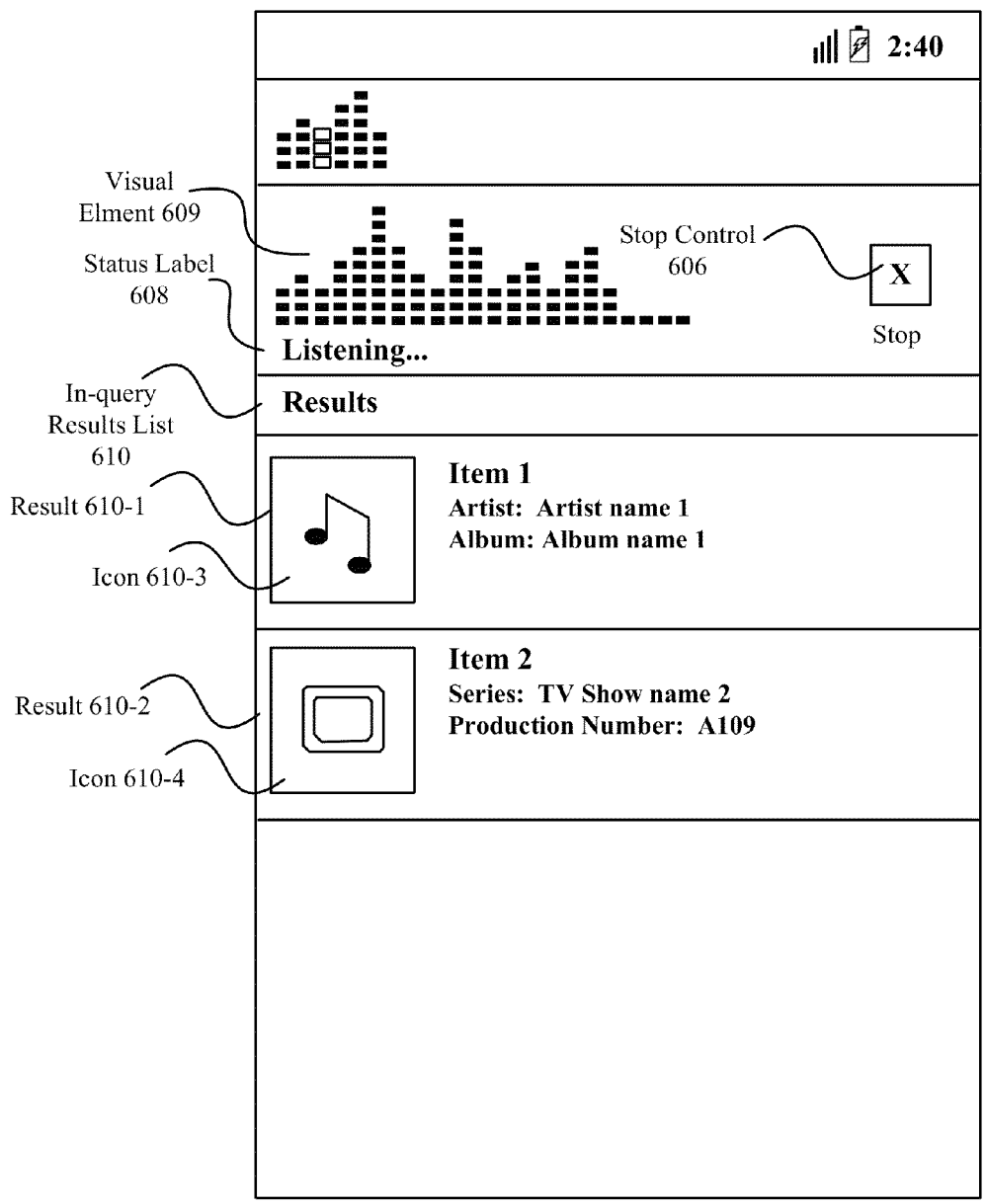
Figure 6F:
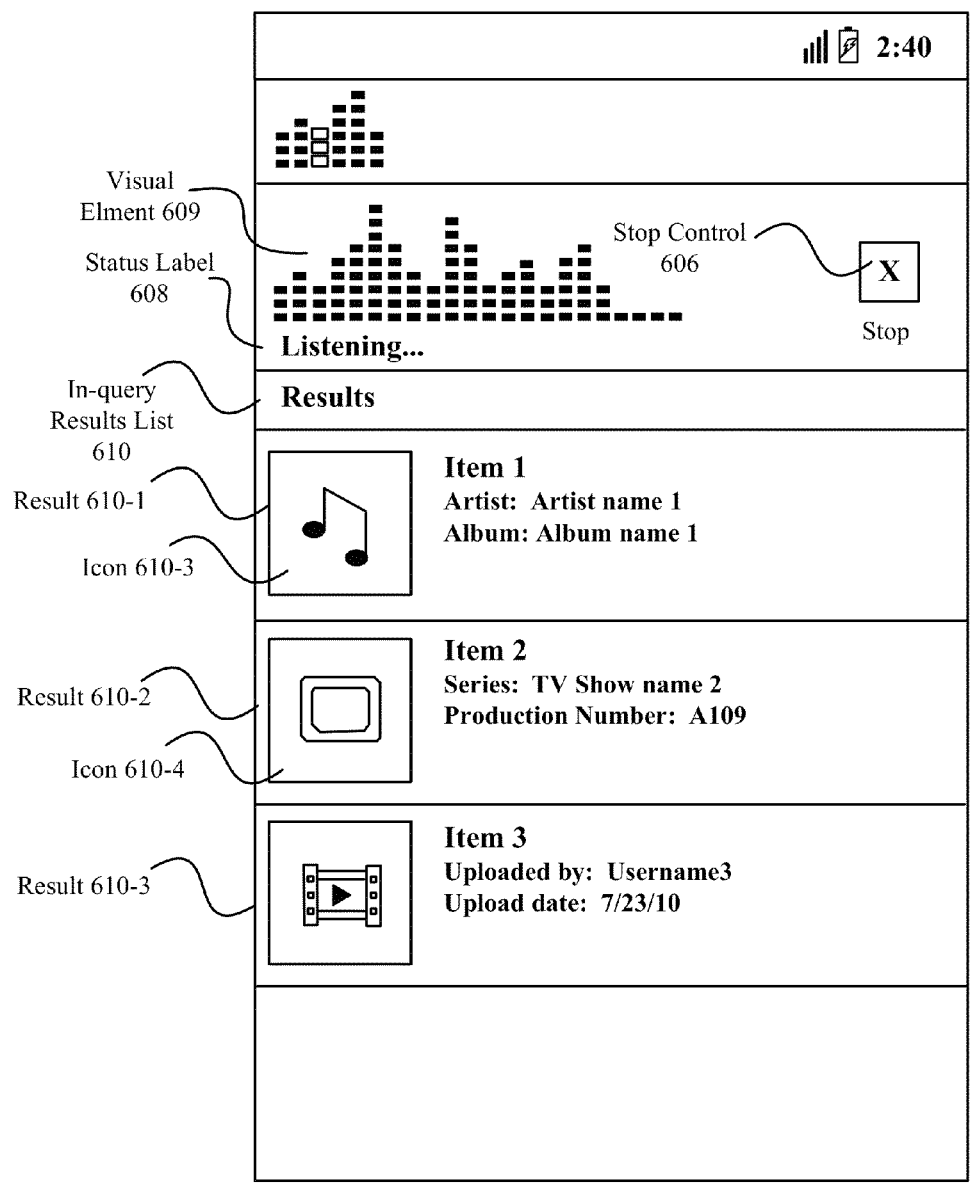

FIGS. 6E and 6F illustrate the user interface 600 during an audio recognition query. In particular, FIG. 6E illustrates the user interface 600 at a first point in the query. FIG. 6F illustrates the user interface 600 at a later point in the query. As shown in both FIGS. 6E and 6F, the user interface 600 includes a stop control 606, a status label 608, a visual element 609, and an in-query results list 610.

The stop control 606 enables a user to terminate an audio recognition query. In particular, if a user selection of the stop control 606 is received, processing of the audio sample ends (e.g., recording and/or transmitting of the audio sample ceases). The status label 608 and the visual element 609 provide information regarding the status of an audio recognition query. More specifically, the status label 608 provides a text-based indication of a query's status. For example, in FIG. 6E, the status label 608 indicates that the client 120 is "listening," which indicates that an audio sample is currently being recorded and/or transmitted to the audio recognition service 130. The visual element 609 provides a visual indication of a query's status. In particular, while an audio sample is being recorded and/or transmitted, the visual element 609 visually represents the sound of the audio sample. For example, the visual element 609 displays an animation based on the frequency spectrum or loudness of the audio sample.

The in-query results list 610 enables a user to view results that are returned from the audio recognition service 130 during an audio recognition query. In one embodiment, the in-query results list 610 is populated with results in real-time or in near real-time. More specifically, the in-query results list 610 can be populated with results received from the service 100 at the same time that the audio sample is still being recorded and/or transmitted to the service 100. Furthermore, the in-query results list 610 can be updated as additional results are returned. For example, in FIG. 6E, the in-query results list 610 includes two results: 610-1 and 610-2. In FIG. 6F, which illustrates the user interface 600 at a later time (e.g., a few moments later), the in-query results list 610 includes three results: 610-1, 610-2, and 610-3.

The in-query results list 610 can include results with different content and information types, corresponding to the various different recognition modules. For example, as shown in FIG. 6E, the in-query results list 610 includes the result 610-1, which is associated with a music type, and the result 610-2, which is associated with a television program type. A result's content type can be indicated in any suitable manner. For example, in FIG. 6E, each result's content type is indicated by an icon (e.g., the icons 610-3 and 610-4).

The in-query results list 610 can further be organized based on content type. For example, results having the same content type can be grouped together. Different content and information types can additionally have their own views in the user interface 600. For instance, the in-query results list 610 may include a separate result section for each content type, such as a different tab in the user interface 600. As another example, the in-query results list 610 may include a separate information section for each information type included within a result. For example, the user interface 600 may comprise a first tab including identification information for a result such as a song, a second tab including reviews for the song, and a third tab including comments about the song retrieved from a social networking service.

The results in the in-query results list 610 can additionally be ordered and prioritized. For example, the results can be ordered based on content type, time or quality. The manner in which the results are prioritized can be based on, for example, preferences input by the user. Illustratively, a user may have previously indicated that he or she is primarily interested in results associated with music. As such, results having a music type may be shown ahead of other results. For example, results associated with the music type may be listed higher on the in-query results list 610.

Each result can include information specific to its content type. For example, the result 610-1 includes artist and album information. In contrast, the result 610-2 includes series name and production number information. A user can select a result from the in-query results list 610 in order to obtain additional information about the result. For example, by selecting a result referencing a particular song, the user can obtain information regarding the song's title, artist, album, etc. In one embodiment, the information presented can include offers to purchase items. For example, by selecting a result referencing a movie, the user may be presented with an offer to purchase a digital copy of the movie from an online retailer.

Figure 7:
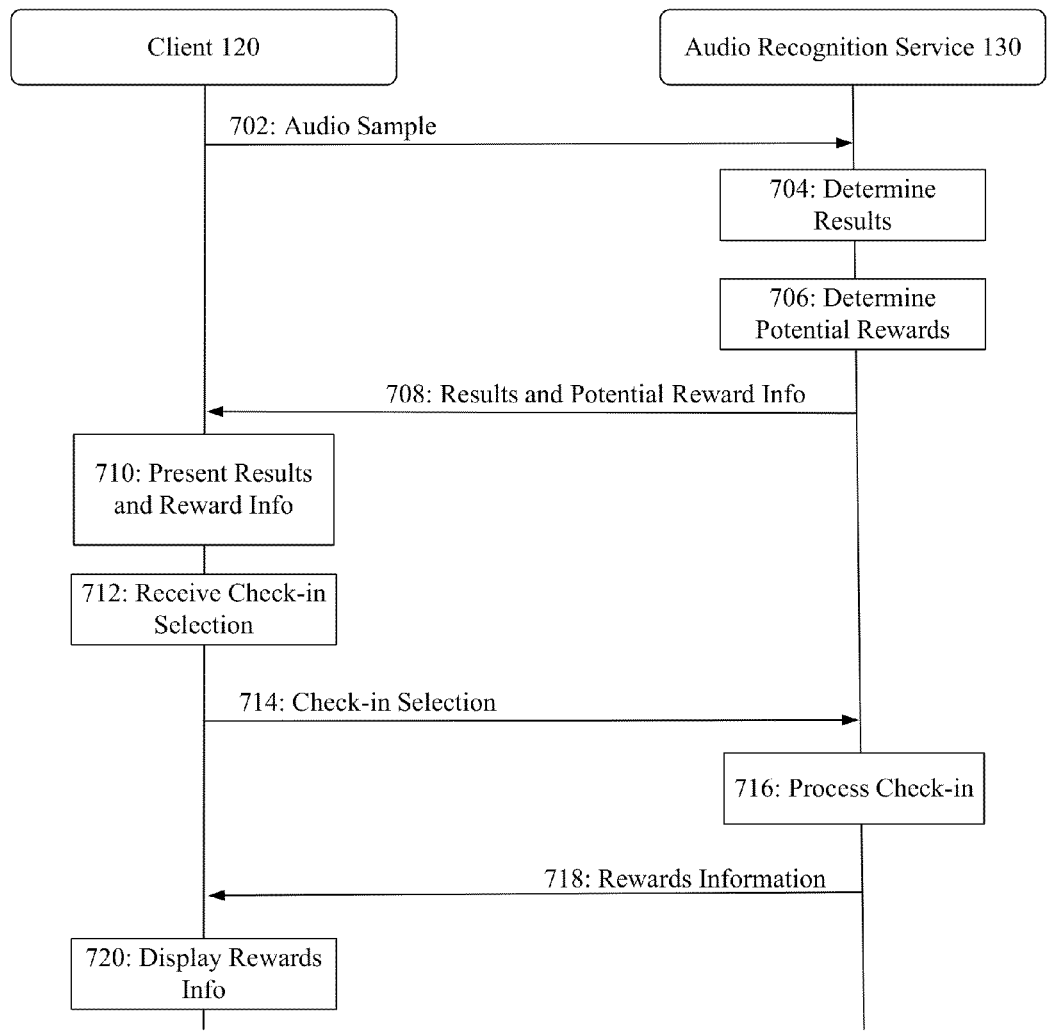
FIG. 7 illustrates an interaction diagram showing a method for providing rewards based on a check-in in accordance with aspects described herein.

FIG. 7 illustrates an interaction diagram showing a method for providing a reward based on a check-in in accordance with one embodiment. Other embodiments can perform one or more steps of FIG. 7 in a different sequence. Moreover, other embodiments can include additional and/or different steps than the ones described herein.

As shown in FIG. 7, the client 120 transmits 702 an audio sample to be identified. In response to receiving at least a portion of the audio sample, the audio recognition service 130 determines 704 a set of results that matches the audio sample. Based on these results, the reward component of the audio recognition service 130 determines 706 a set of potential rewards (e.g., discounts, promotional packages, coupon codes, virtual items, virtual badges, virtual symbols, achievement levels, etc). More specifically, the reward component can access the rewards database 224 in response to receiving results. The reward component can thereafter perform a lookup of each content item identified in the results to determine whether there are any rewards associated with the content item.

The results and potential rewards information are sent 708 to the client 120. Thereafter, the client 120 presents 710 the results and potential rewards information to the user via a user interface. The results and potential rewards information can be subsequently updated as additional results and potential rewards information are received by the client 120. The updates can be a result of the audio recognition service 130 receiving and processing additional portions of the audio sample.

After presenting the results and potential rewards information to the user, the client 120 receives 712 a check-in selection from the user. The check-in selection indicates that the user wishes to check-in to a content item indicated by a result. The client 120 forwards 714 the check-in selection to the audio recognition service 130. Upon receiving the check-in selection, the audio recognition service 130 processes 716 the check-in. In particular, the check-in component may notify a social network or other service that the user is currently listening to, viewing, likes, or otherwise interacting with the content item associated with the check-in. The service can, in turn, publish such information to the user's profile. The services that the audio recognition service 130 notifies can be those services that the user has previously authorized the audio recognition service 130 to contact.

The reward component can additionally determine whether the user is eligible for a reward based on the check-in selection. In particular, the reward component can access the user database to determine a user's current number of check-ins for the content item referenced by the check-in selection or for a set of related content items that includes the referenced content item. The reward component can additionally access the rewards database to determine whether the user is eligible for a reward. In particular, the reward criteria and expiration for a reward from the rewards database are checked against the number of user check-ins for the content item or set of content items. If all conditions are met, (e.g., the user's total number of check-ins meets a threshold indicated by the reward criteria) the audio recognition service 130 provides the reward to the user. For example, the audio recognition service 130 can generate a coupon code usable at an electronic marketplace. As another example, the audio recognition service 130 may notify a social network or other service that the user has earned for a virtual badge.

Upon processing the check-in, the audio recognition service 130 sends 718 information about the reward to the client 120. The information can, for example, indicate that the user has earned a virtual badge for his or her social network user profile. After receiving the information, the client 120 displays 720 the information via the user interface to the user.

Figure 8A:
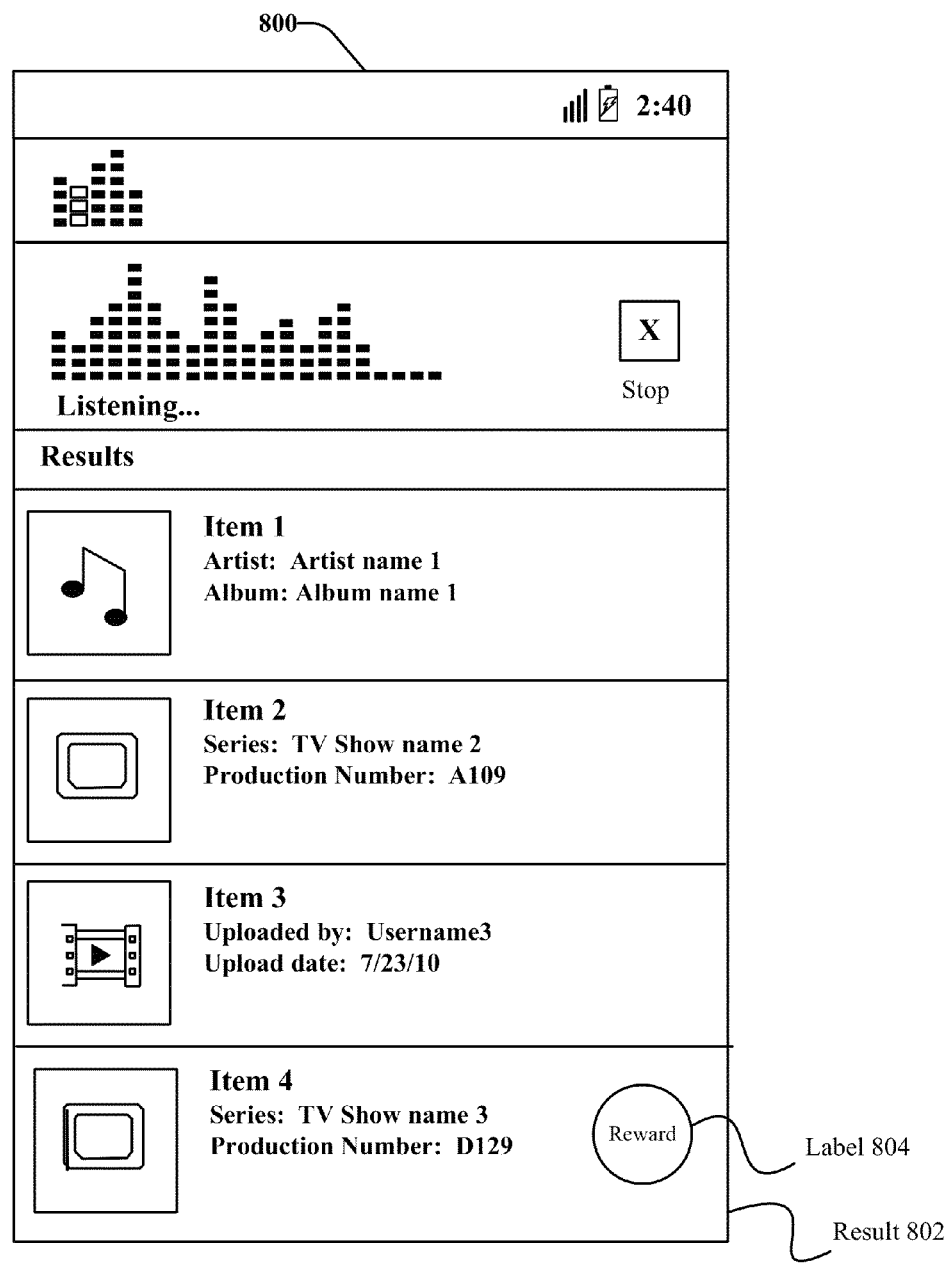
FIGS. 8A-8D illustrate a user interface for supporting check-in selection and reward procurement in accordance with aspects described herein.

FIGS. 8A-8D illustrate a user interface 800 for supporting check-in selection and reward procurement in accordance with one embodiment. The user interface 800 can be displayed by an audio search application (e.g. application 122) installed on a client device. FIG. 8A illustrates the user interface 800 during an audio recognition query. As shown in FIG. 8A, the user interface 800 presents a number of results, including the result 802. The result 802 includes label 804, which provides an indication that a reward can be earned in response to checking-in to the content item referenced by the result. The label 804 can provide such an indication in any suitable manner. As shown, in FIG. 8A, the label 804 can be text based. The label 804 can additionally or alternatively include a visual element, such as an icon or virtual symbol.

Figure 8B:
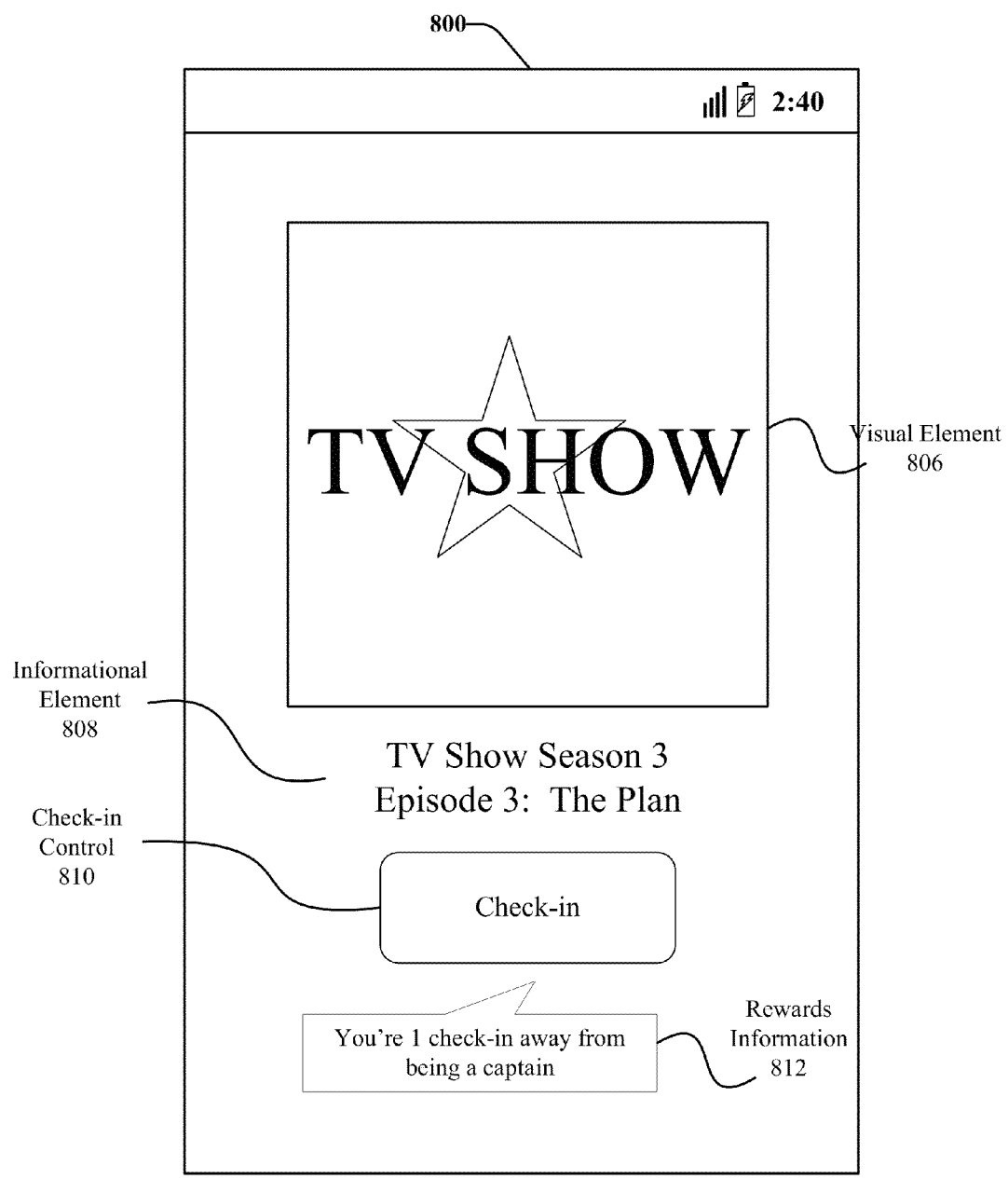

FIG. 8B illustrates the user interface 800 after a user has selected a result associated with a reward (e.g., result 802 of FIG. 8A). As shown in FIG. 8B, the user interface 800 includes a visual element 806, an informational element 808, a check-in control 810, and rewards information 812. The visual element 806 generally includes an image associated with a content item indicated by a selected result. Illustratively, in FIG. 8B, the visual element 806 displays an image of a stylized title of a television show. The informational element 808 includes information regarding a content item referenced by a result. For example, in FIG. 8B, the informational element 808 provides the season number, episode title, and episode number for a television show episode. The check-in control 810 enables a user to check-in to a content item referenced by the result. In particular, upon receiving a selection of the check-in control 810, the audio search application 122 can cause a check-in selection to be communicated to the audio recognition service for processing (e.g., rewards procurement, check-in publication, etc.) The rewards information 812 provides information regarding a reward that the user can earn if he or she checks-in to a content item. Illustratively, in FIG. 8B, the rewards information 812 indicates that the user can attain an achievement level (e.g., the level of captain) in response to checking-in. Other rewards not included in the rewards information 812 can also be earned by the user in response to checking-in. The rewards information 812 can further indicate the number of remaining check-ins needed to earn the reward. In FIG. 8B, for example, the rewards information 812 indicates that the user must check-in one more time prior to attaining a specific achievement level.

Figure 8C:
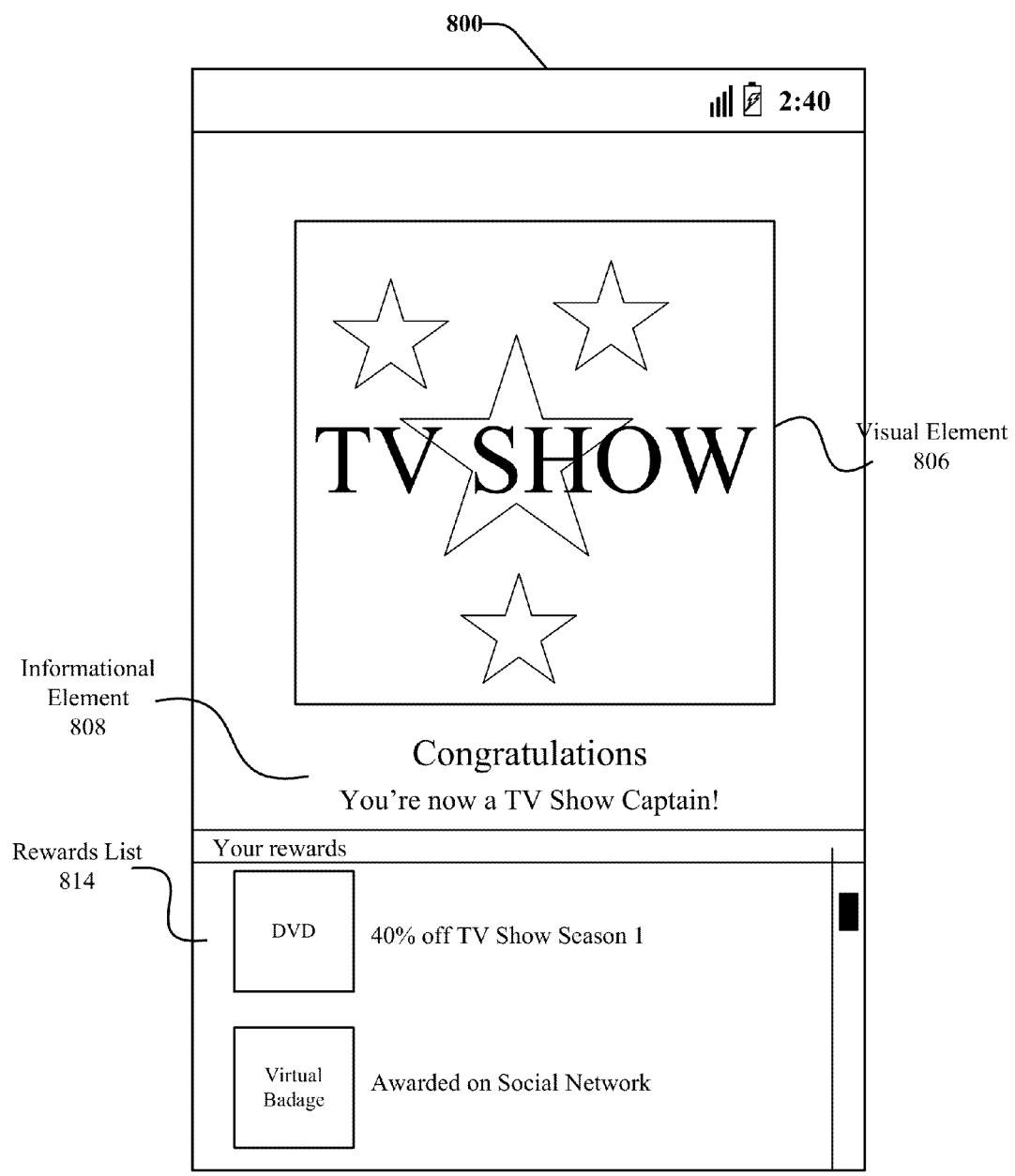

FIG. 8C illustrates the user interface 800 after a user has checked-in and earned a number of rewards. As shown in FIG. 8C, the user interface 800 includes the visual element 806, informational element 808, and rewards list 814. As in FIG. 8B, the visual element 806 can display an image associated with the content item. However, in FIG. 8C, the stylized title is changed to indicate the user's new achievement level of captain. As further shown in FIG. 8C, the informational element 808 additionally provides a text-based indication relating to the user's reward. In particular, the information element provides an indication of the user's new achievement level. The rewards list 814 can indicate the rewards that a user has earned as a result of checking-in to the content item. As shown in FIG. 8C, the rewards list 814 includes information regarding a 40% discount for a Blu-Ray collection. The rewards list 814 additionally includes information indicating that the user has earned a virtual badge. The information provided in the rewards list 814 can be text-based and/or image-based (e.g., icons, etc.). The information provided in the rewards list 814 can additionally include links to websites, online stores, online services, etc. For example, the rewards list 814 may include a reward for a discount on a Blu-Ray collection. Responsive to a selection of the reward, the audio search application 122 can cause a web browser application to be executed, and to display a page of an online store selling the Blu-Ray collection. The audio search application 122 can further communicate to the online store that the user is entitled to a discount on the collection. In one implementation, the user is awarded each of the rewards displayed in rewards list 814. In another implementation, the user can select one or more rewards from the rewards list 814 to be awarded. Illustratively, by checking-in to a television show episode 5 times, the user can become eligible to select two rewards from a set of ten rewards in the rewards list 814.

Figure 8D:
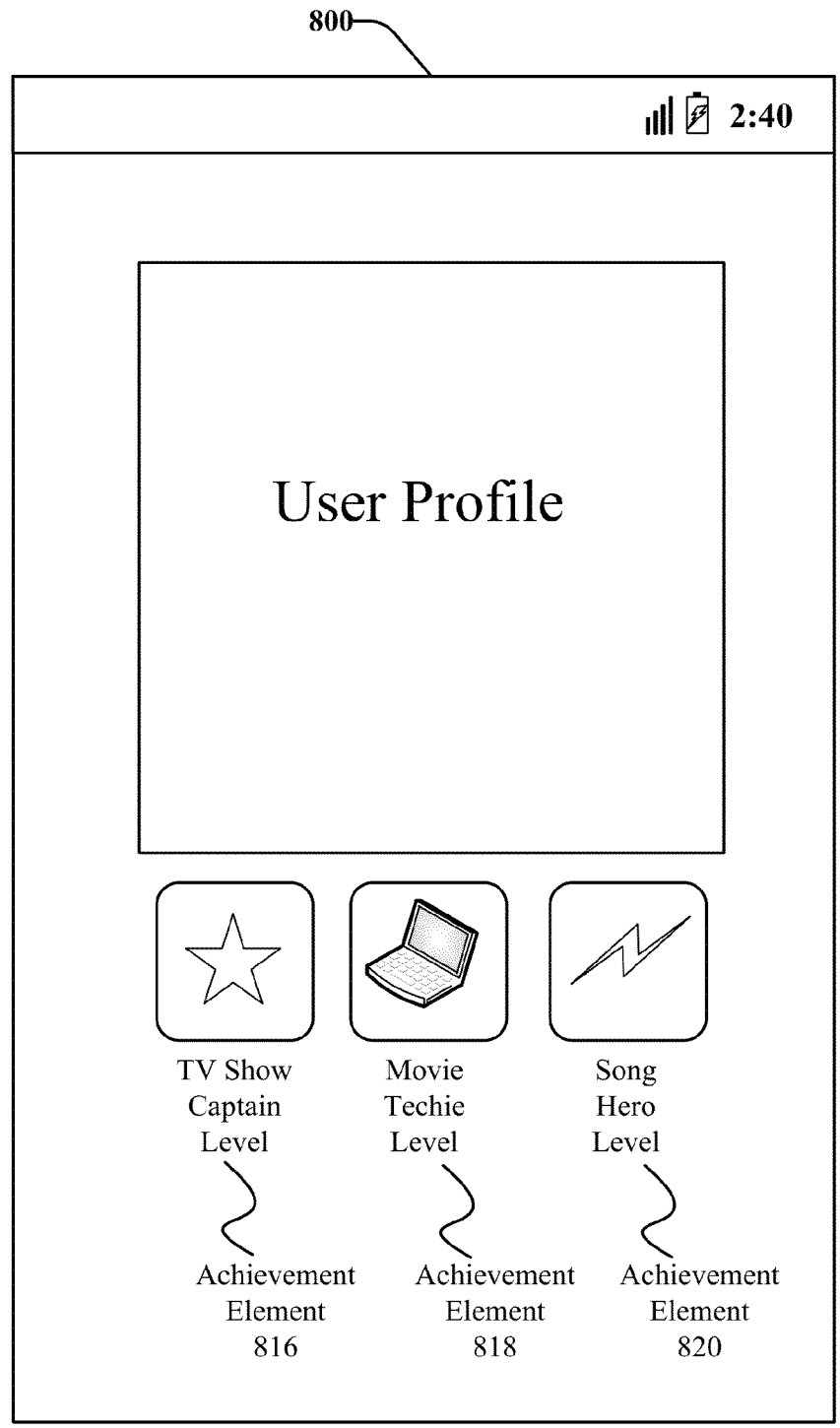

FIG. 8D illustrates a user profile provided by user interface 800. The user profile can be accessible from within the audio search application 122. As shown in FIG. 8D, the user profile includes a number of achievement elements 816, 818, and 820. The achievement element can indicate the achievement level a user has reached for a particular content item or set of content items. For example, in FIG. 8D, achievement element 816 indicates that a user has earned the achievement level of captain for a particular television show. In one implementation, the user can select an achievement level element in order to access information regarding rewards for the corresponding achievement level. In particular, responsive to a selection of the achievement level element 816, the audio search application 122 can display the user interface elements and information shown in FIG. 8C.

Figure 9:
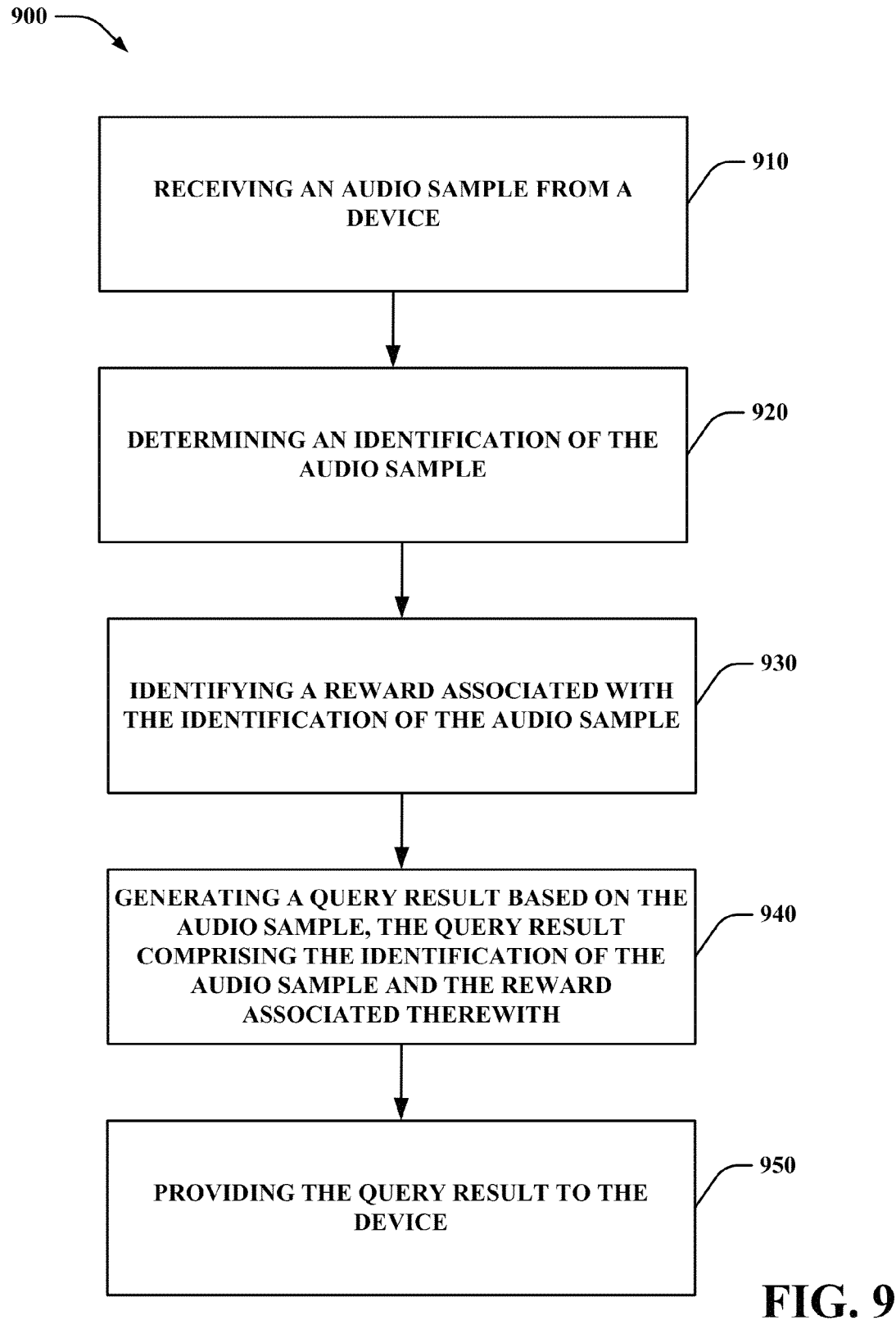
FIG. 9 is an exemplary flow diagram of a method for processing an audio sample by an audio recognition service in accordance with aspects described herein.
Figure 10:
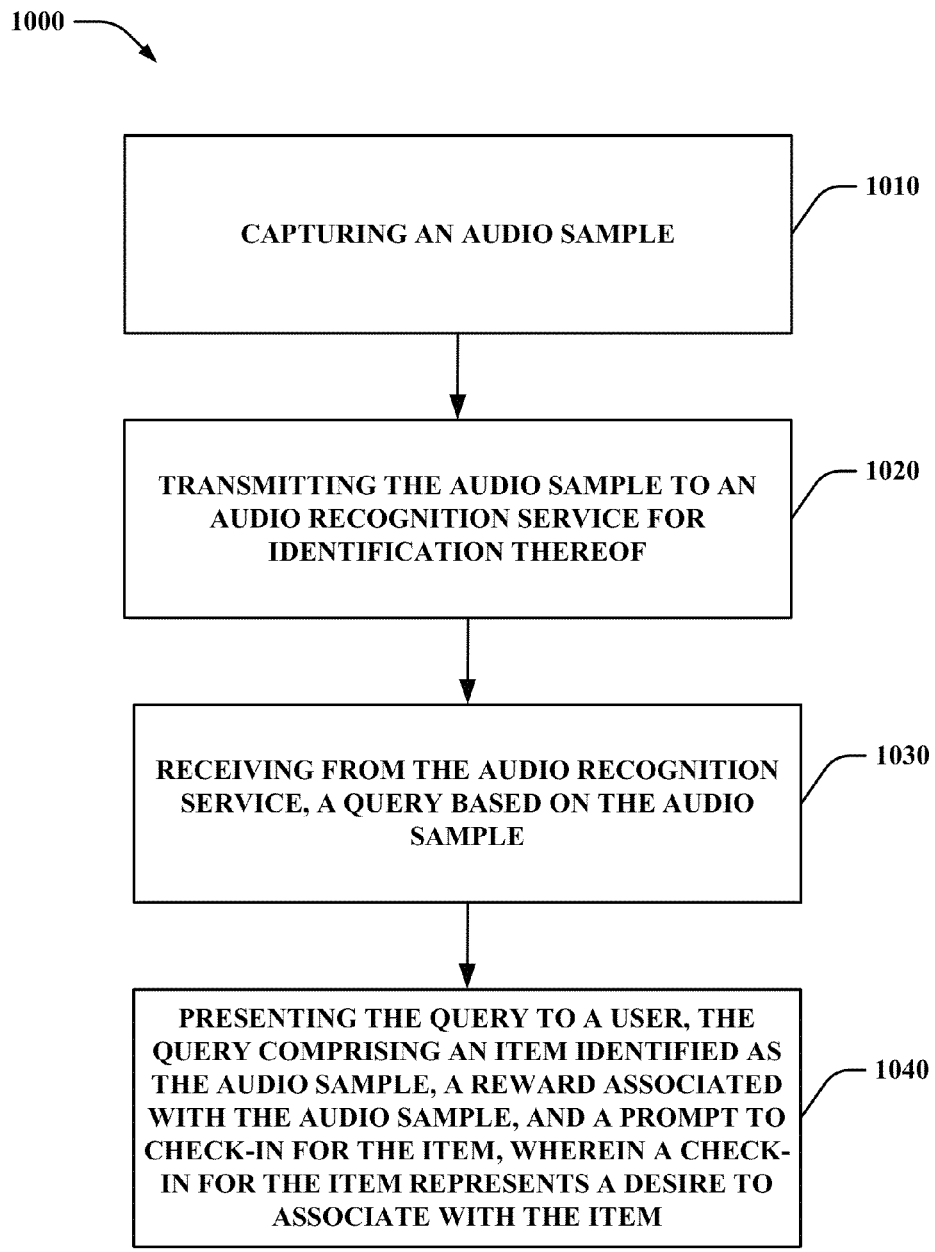
FIG. 10 is another exemplary flow diagram of a method for receiving information about an audio sample at a client device in accordance with aspects described herein.

FIGS. 9-10 illustrates methodologies or flow diagrams in accordance with certain aspects of this disclosure. While, for purposes of simplicity of explanation, the methodologies are shown and described as a series of acts, the disclosed subject matter is not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with the disclosed subject matter. Additionally, it is to be appreciated that the methodologies disclosed in this disclosure are capable of being stored on an article of manufacture to facilitate transporting and transferring such methodologies to computers or other computing devices.

Referring now to FIG. 9, presented is a flow diagram of an example application of systems and apparatuses disclosed in this description in accordance with an embodiment. In an aspect, in exemplary methodology 900, an audio recognition service processes an audio sample to generate a query having information about the audio sample and a reward associated with the audio sample. At 910, an audio sample is received from a device (e.g. using query component 310). At 920, an identification of the audio sample is determined (e.g. using audio sample recognition component 320). At 930, a reward associated with the identification of the audio sample is identified (e.g. using reward component 330). At 940, a query result is generated based on the audio sample, the query result comprising the identification of the audio sample and the reward associated therewith (e.g. using query component 310). At 950, the query result is provided to the device (e.g. using query component 310).

Turning now to FIG. 10, presented is a flow diagram of another example application of systems and apparatuses disclosed in this description in accordance with an embodiment. In an aspect, in exemplary methodology 1000, user device captures an audio sample and employs an audio recognition service to receive information about the audio sample. At 1010, an audio sample is captured by a client device (e.g. using audio sampling component 240). At 1020 the audio sample is transmitted to an audio recognition service for identification thereof (e.g. using search component 210). At 1030, a query result based on the audio sample is received from the audio recognition service (e.g. via search component). At 1040, the query result is presented to a user, the query result comprising an item identified as the audio sample, a reward associated with the item, and a prompt to check-in for the item, wherein a check-in for the item represents a desire to associate with the item (e.g. via interface component 230). After a query result is presented to a user, the user can elect to check-in for item. For example, a user can check-in selections for the item can be received via response component 220. The response component 220 can then send the check-in selection to the audio recognition service. In an aspect, in response to a check in, the user device can receive the reward In situations in which the systems discussed herein collect personal information about users, or may make use of personal information (e.g. information pertaining to user identity and audio samples associated with a user), the users may be provided with an opportunity to control whether programs or features collect user information, or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (e.g. to a city, Zip code, or state level), so that a particular location of a user cannot be determined. Thus, the user may have control over how information is collected about the user and used by a content server, such as audio recognition service 130.

Exemplary Networked and Distributed Environments

Figure 11:
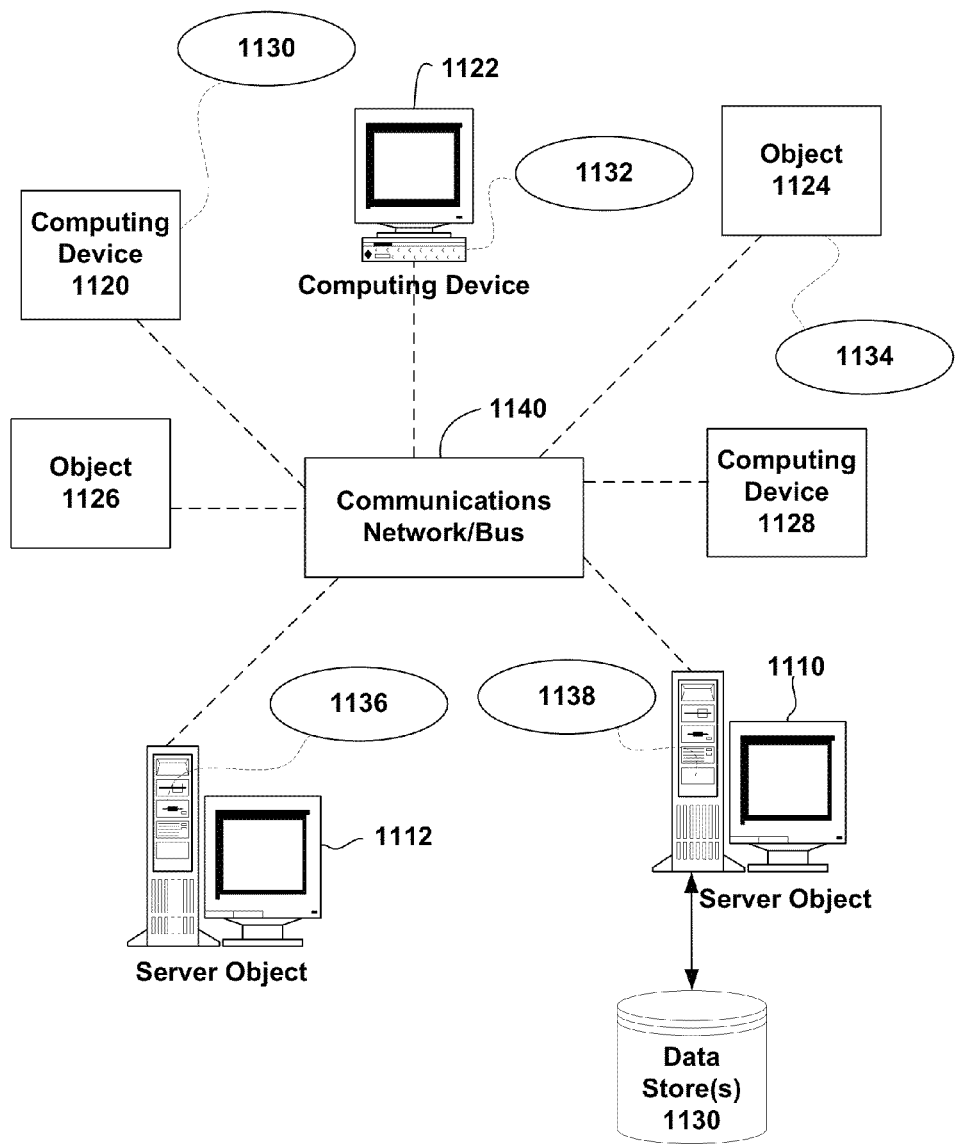
FIG. 11 is an illustration of a schematic diagram of an exemplary networked or distributed computing environment with which one or more aspects described herein can be associated.

FIG. 11 provides a schematic diagram of an exemplary networked or distributed computing environment with which one or more aspects described in this disclosure can be associated. The distributed computing environment includes computing objects 1110, 1112, etc. and computing objects or devices 1120, 1122, 1124, 1126, 1128, etc., which can include programs, methods, data stores, programmable logic, etc., as represented by applications 1130, 1132, 1134, 1136, 1138. It can be appreciated that computing objects 1110, 1112, etc. and computing objects or devices 1120, 1122, 1124, 1126, 1128, etc. can include different devices, such as client devices and/or audio recognition service 130 (and components thereof), personal digital assistants (PDAs), audio/video devices, mobile phones, MPEG-1 Audio Layer 3 (MP3) players, personal computers, laptops, tablets, etc.

Each computing object 1110, 1112, etc. and computing objects or devices 1120, 1122, 1124, 1126, 1128, etc. can communicate with one or more other computing objects 1110, 1112, etc. and computing objects or devices 1120, 1122, 1124, 1126, 1128, etc. by way of the communications network 1140, either directly or indirectly. Even though illustrated as a single element in FIG. 11, network 1140 can include other computing objects and computing devices that provide services to the system of FIG. 11, and/or can represent multiple interconnected networks, which are not shown.

In a network environment in which the communications network/bus 1140 can be the Internet, the computing objects 1110, 1112, etc. can be Web servers, file servers, media servers, etc. with which the client computing objects or devices 1120, 1122, 1124, 1126, 1128, etc. communicate via any of a number of known protocols, such as the hypertext transfer protocol (HTTP).

Exemplary Computing Device

As mentioned, advantageously, the techniques described in this disclosure can be associated with any suitable device. It is to be understood, therefore, that handheld, portable and other computing devices (including client devices, devices of audio recognition service 130 or components that compute and/or perform various functions). As described, in some aspects, the device can be the client device(s) 120 and/or the audio recognition service 130 described herein. In various aspects, the data store can include or be included within, any of the memory described herein, any of the contact lenses described herein and/or the control device described herein. In various aspects, the data store can be any repository for storing information transmitted to or received from the contact lens.

Figure 12:
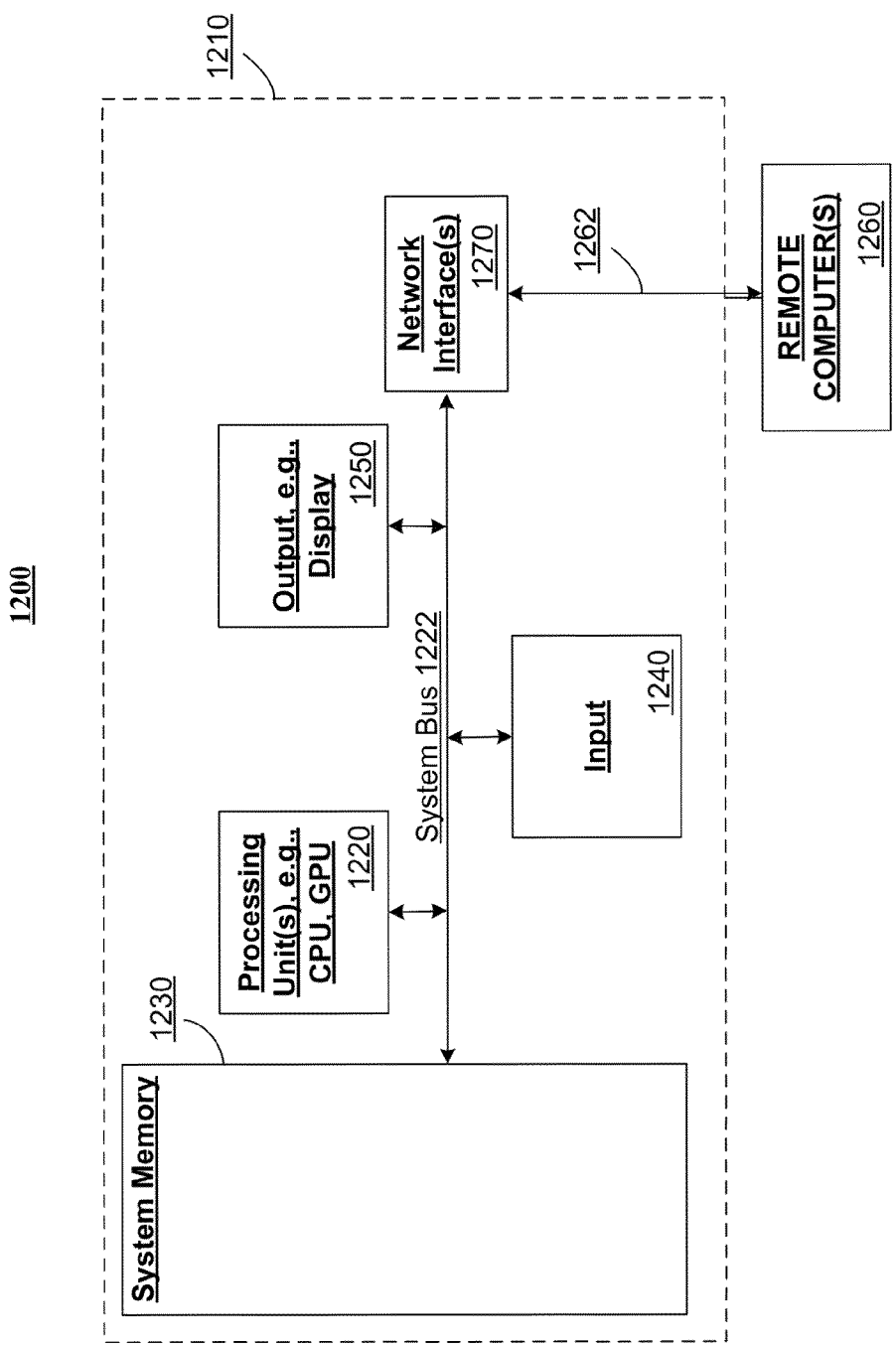
FIG. 12 is an illustration of a schematic diagram of an exemplary computing environment with which one or more aspects described herein can be associated.

FIG. 12 illustrates an example of a suitable computing system environment 1200 in which one or aspects of the aspects described in this disclosure can be implemented. Components of computer 1210 can include, but are not limited to, a processing unit 1220, a system memory 1230, and a system bus 1222 that couples various system components including the system memory to the processing unit 1220.

Computer 1210 typically includes a variety of computer readable media and can be any available media that can be accessed by computer 1210. The system memory 1230 can include computer storage media in the form of volatile and/or nonvolatile memory such as read only memory (ROM) and/or random access memory (RAM). By way of example, and not limitation, memory 1230 can also include an operating system, application programs, other program components, and program data.

A user can enter commands and information into the computer 1210 through input devices 1240 (e.g., keyboard, keypad, a pointing device, a mouse, stylus, touchpad, touch screen, motion detector, camera, microphone or any other device that allows the user to interact with the computer 1210). A monitor or other type of display device can be also connected to the system bus 1222 via an interface, such as output interface 1250. In addition to a monitor, computers can also include other peripheral output devices such as speakers and a printer, which can be connected through output interface 1250.

The computer 1210 can operate in a networked or distributed environment using logical connections to one or more other remote computers, such as remote computer 1260. The remote computer 1260 can be a personal computer, a server, a router, a network PC, a peer device or other common network node, or any other remote media consumption or transmission device, and can include any or all of the elements described above relative to the computer 1210. The logical connections depicted in FIG. 12 include a network 1270, such local area network (LAN) or a wide area network (WAN), but can also include other networks/buses e.g., cellular networks.

Computing devices typically include a variety of media, which can include computer-readable storage media and/or communications media, in which these two terms are used herein differently from one another as follows. Computer-readable storage media can be any available storage media that can be accessed by the computer, can be typically of a non-transitory nature, and can include both volatile and non-volatile media, removable and non-removable media. By way of example, and not limitation, computer-readable storage media can be implemented in connection with any method or technology for storage of information such as computer-readable instructions, program components, structured data, or unstructured data. Computer-readable storage media can include, but are not limited to, RAM, ROM, electrically erasable programmable read only memory (EEPROM), flash memory or other memory technology, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium. In various aspects, the computer-readable storage media can be, or be included within, the memory, contact lens (or components thereof) or reader described herein.

On the other hand, communications media typically embody computer-readable instructions, data structures, program components or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals.

It is to be understood that the aspects described in this disclosure can be implemented in hardware, software, firmware, middleware, microcode, or any combination thereof. For a hardware aspect, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors and/or other electronic units designed to perform the functions described in this disclosure, or a combination thereof.

For a software aspect, the techniques described in this disclosure can be implemented with components or components (e.g., procedures, functions, and so on) that perform the functions described in this disclosure. The software codes can be stored in memory units and executed by processors.

What has been described above includes examples of one or more aspects. It is, of course, not possible to describe every conceivable combination of components or methodologies for purposes of describing the aforementioned aspects, but one of ordinary skill in the art can recognize that many further combinations and permutations of various aspects are possible. Accordingly, the described aspects are intended to embrace all such alterations, modifications and variations that fall within the spirit and scope of the appended claims.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The aforementioned systems have been described with respect to interaction between several components. It can be appreciated that such systems and components can include those components or specified sub-components. Sub-components can also be implemented as components communicatively coupled to other components rather than included within parent components (hierarchical). Additionally, it is to be noted that one or more components can be combined into a single component providing aggregate functionality. Any components described in this disclosure can also interact with one or more other components not specifically described in this disclosure but generally known by those of skill in the art.

In view of the exemplary systems described above methodologies that can be implemented in accordance with the described subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks can occur in different orders and/or concurrently with other blocks from what is depicted and described in this disclosure. Where non-sequential, or branched, flow is illustrated via flowchart, it can be appreciated that various other branches, flow paths, and orders of the blocks, can be implemented which achieve the same or a similar result. Moreover, not all illustrated blocks may be required to implement the methodologies described in this disclosure after.

In addition to the various aspects described in this disclosure, it is to be understood that other similar aspects can be used or modifications and additions can be made to the described aspect(s) for performing the same or equivalent function of the corresponding aspect(s) without deviating there from. Still further, multiple processing chips or multiple devices can share the performance of one or more functions described in this disclosure, and similarly, storage can be provided across a plurality of devices. The invention is not to be limited to any single aspect, but rather can be construed in breadth, spirit and scope in accordance with the appended claims.

What is claimed is:

1. A system, comprising:
 a non-transitory computer readable medium having stored thereon computer executable components; and
 a processor configured to execute the following computer executable components stored in the non-transitory computer readable medium:
  a query component configured to receive an audio sample from a device;
  a recognition component configured to determine an identification of the audio sample;
  a reward component configured to identify a reward associated with the identification of the audio sample, wherein the reward can be earned based upon a predetermined number of check-ins acknowledging playback of a content item representative of the identification of the audio sample;

wherein the query component is further configured to provide a query result to the device, the query result comprising the identification of the audio sample and the reward associated therewith;

a check-in component configured to receive a check-in selection for the content item representative of the identification of the audio sample, the check-in selection indicating a user acknowledged playback of the content item; and wherein the reward component is further configured to issue the reward in response to the check-in selection meeting the predetermined number of check-ins.

2. The system of claim 1, wherein the reward includes a coupon associated with the item.

3. The system of claim 1, wherein the check-in component is further configured to, in response to the check-in selection, send a request to a social network service to post an indication of the user acknowledged playback of the content item on the social network service in association with a profile of the user.

4. The system of claim 3, wherein the reward includes at least one of an image, a video, an audio clip, a virtual item, a virtual badge, or a virtual symbol.

5. The system of claim 1, wherein the playback includes at least one of listening to or viewing the content item.

6. The system of claim 1, wherein the predetermined number of check-ins is greater than one.

7. The system of claim 1, wherein the content item is a television show, a song, a speech, a movie, or a video.

8. A method comprising:

receiving, by a system including a processor, a transmission of an audio sample from a device;

determining, by the system, an identification of the audio sample;

identifying, by the system, a reward associated with the identification of the audio sample, wherein the reward can be earned based upon a predetermined number of check-ins acknowledging playback of a content item representative of the identification of the audio sample;

generating, by the system, a query result based on the audio sample, the query result comprising the identification of the audio sample and the reward associated therewith;

transmitting, by the system, the query result to the device;

receiving, by the system, a check-in selection for the content item representative of the identification of the audio sample, the check-in selection indicating a user acknowledged playback of the content item; and issuing, by the system, the reward in response to the check-in selection meeting the predetermined number of check-ins.

9. The method of claim 8, wherein the reward includes a coupon associated with the item.

10. The method of claim 8, further comprising, in response to the check-in selection, sending a request to a social network service to post an indication of the user acknowledged playback of the content item on the social network service in association with a profile of the user.

11. The method of claim 10, wherein the reward includes at least one of an image, a video, an audio clip, a virtual item, a virtual badge, or a virtual symbol.

12. The method of claim 8, wherein the playback includes at least one of listening to or viewing the content item.

13. The method of claim 8, wherein the predetermined number of check-ins is greater than one.

14. A system, comprising:

a non-transitory computer readable medium having stored thereon computer executable components; and a processor configured to execute the following computer executable components stored in the non-transitory computer readable medium:

an audio sampling component configured to capture an audio sample;

a search component configured to transmit the audio sample to an audio recognition service for identification thereof and receive, from the audio recognition service, a query result based on the audio sample; and an interface component configured to present the query result to a user, the query result comprising a content item identified as the audio sample, a reward associated with the content item, wherein the reward can be earned based upon a predetermined number of check-ins acknowledging playback of a content item representative of the identification of the audio sample, and a prompt to check-in for the item, wherein a check-in for the item represents a user acknowledged playback of the content item; and a response component configured to:

receive a selection from a user to check-in for the content item, send the check-in selection to the audio recognition service, and receive the reward in response to the check-in selection meeting the predetermined number of check-ins.

* * * * *